United States Patent
Takami et al.

(10) Patent No.: US 6,544,682 B1
(45) Date of Patent: Apr. 8, 2003

(54) NONAQUEOUS ELECTROLYTE SECONDARY BATTERY

(75) Inventors: Norio Takami, Yokohama (JP); Hiroyuki Hasebe, Chigasaki (JP); Takahisa Ohsaki, Yokohama (JP); Motoya Kanda, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/487,612

(22) Filed: Jan. 20, 2000

(30) Foreign Application Priority Data

Jan. 22, 1999 (JP) .......................... 11-014039
Mar. 2, 1999 (JP) .......................... 11-053576

(51) Int. Cl.$^7$ .................................. H01M 2/02
(52) U.S. Cl. ........................... 429/62; 429/163
(58) Field of Search ...................... 429/62, 231.95, 429/163, 231.8, 188, 324, 326, 131, 136, 153, 162, 174, 176

(56) References Cited

U.S. PATENT DOCUMENTS

| | | | |
|---|---|---|---|
| 5,437,692 A | | 8/1995 | Dasgupta et al. |
| 5,741,608 A | | 4/1998 | Kojima et al. |
| 5,824,430 A | * | 10/1998 | Higuchi et al. ............... 429/62 |
| 5,834,135 A | | 11/1998 | Pendalwar et al. |
| 5,902,696 A | * | 5/1999 | Smesko et al. ............. 429/142 |
| 6,004,693 A | * | 12/1999 | Fukuda et al. ............. 429/176 |
| 6,030,728 A | * | 2/2000 | Cotte et al. ................. 429/329 |
| 6,093,503 A | * | 7/2000 | Isoyama et al. ............. 429/61 |
| 6,245,456 B1 | * | 6/2001 | Fukuda et al. ............. 429/122 |
| 6,291,098 B1 | * | 9/2001 | Shibuya et al. ................. 9/1 |
| 6,316,140 B1 | * | 10/2001 | Hatazawa et al. .......... 429/163 |
| 6,319,630 B1 | * | 10/2001 | Hasegawa et al. .......... 429/162 |
| 6,337,153 B1 | * | 1/2002 | Kodama et al. ............ 429/163 |

FOREIGN PATENT DOCUMENTS

EP 0 892 452 1/1999

OTHER PUBLICATIONS

Patent Abstracts of Japan, JP 63–318066, Dec. 26, 1988.
Patent Abstracts of Japan, JP 4–337247, Nov. 25, 1992.
Patent Abstracts of Japan, JP 60–023954, Feb. 6, 1985.
Patent Abstracts of Japan, JP 63–205048, Aug. 24, 1988.

\* cited by examiner

Primary Examiner—Patrick Ryan
Assistant Examiner—M. Wills
(74) Attorney, Agent, or Firm—Oblon, Spivak, McClelland, Maier & Neustadt, P.C.

(57) ABSTRACT

Provided is a nonaqueous electrolyte secondary battery, comprising an electrode group including a positive electrode, a negative electrode, and a porous separator interposed between the positive electrode and the negative electrode, the pores of the porous separator being closed when heated, a nonaqueous electrolyte held by the porous separator, and a jacket formed of a sheet including a thermoplastic resin layer forming at least a portion of the inner surface, having the electrode group housed therein, and having mutually facing regions of the thermoplastic resin layer heat-sealed to each other to seal the electrode group therein, wherein the positive electrode, the negative electrode and the separator are made integral, and the thermoplastic resin layer has a melting point higher than a pore-closing initiating temperature of the porous separator at which the pores of the separator begin to be closed.

16 Claims, 3 Drawing Sheets

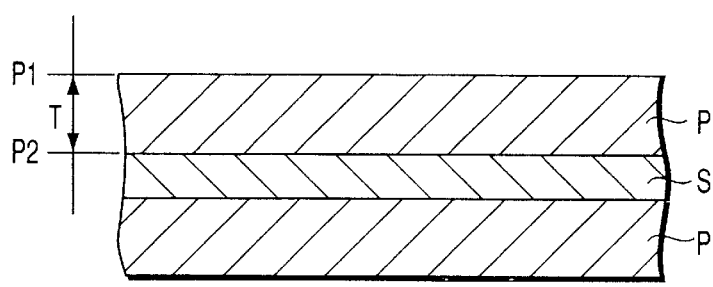
FIG. 1
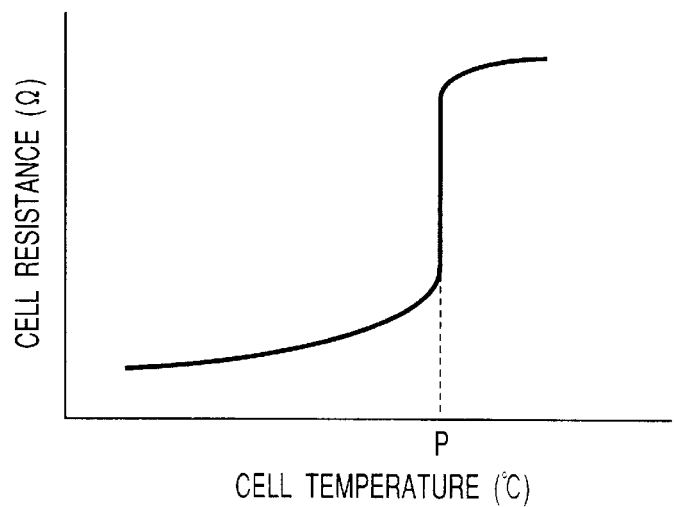
FIG. 2
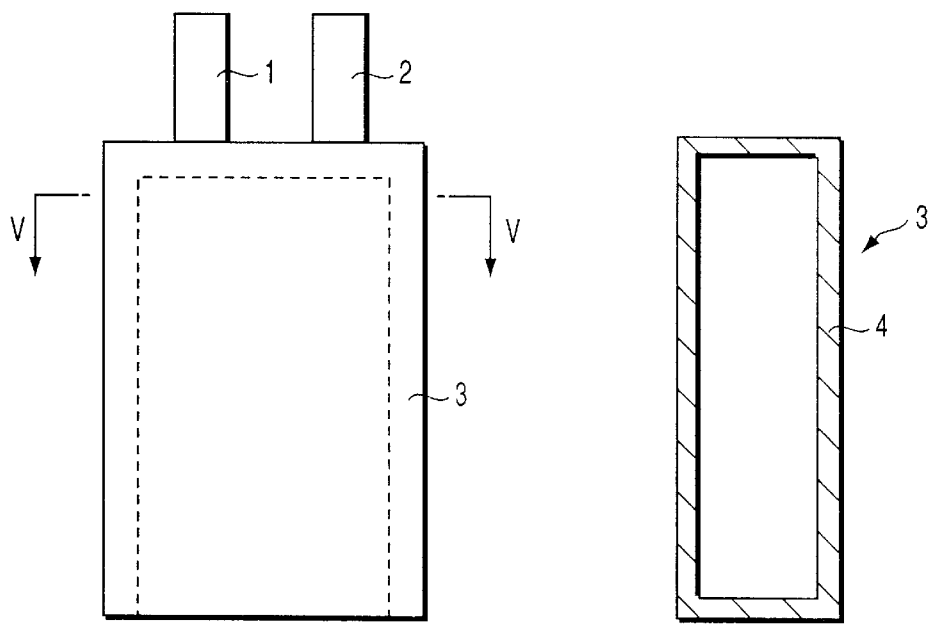
FIG. 3
FIG. 4

NONAQUEOUS ELECTROLYTE SECONDARY BATTERY

BACKGROUND OF THE INVENTION

The present invention relates to a nonaqueous electrolyte secondary battery.

BRIEF SUMMARY OF THE INVENTION

Recently, a lithium ion secondary battery is put on the market as a nonaqueous secondary battery used in a portable electrical appliance such as a portable telephone. The battery comprises a positive electrode containing lithium cobalt oxide ($LiCoO_2$), a negative electrode containing a graphite material or a carbonaceous material, a nonaqueous electrolyte prepared by dissolving a lithium salt in an organic solvent, a separator formed of a porous membrane, and a metal jacket formed of a cylindrical or rectangular metal case.

With decrease in the thickness of a portable appliance, it is requested that the nonaqueous secondary battery be made smaller in thickness and lighter in weight. In order to decrease the thickness of the lithium ion secondary battery to 4 mm or less, it is necessary to decrease the thickness of the metal case used as a jacket.

However, if the thickness of the metal case is decreased, it is difficult to form the metal case itself. Thus, it was substantially difficult to put a lithium ion secondary battery having a thickness not larger than 4 mm to a practical use.

On the other hand, U.S. Pat. No. 5,437,692 discloses a lithium ion secondary battery, in which an electrode group consisting of a positive electrode, a negative electrode and a gel-like polymer electrolyte arranged between the positive and negative electrodes is sealed in a battery housing. The inventions disclosed in these U.S. Patents are intended to improve the cycle life by increasing the mobility of the lithium ions. Also, the details of the battery housing are not described at all in these U.S. Patents.

However, the secondary battery disclosed in this prior art tends to give rise to an abnormal heat generation or temperature elevation because of an external short-circuiting, an over-charging or leaving to stand under high temperatures not lower than 130° C., leading to a dangerous situation that the viscosity of the polymer electrolyte layer is lowered so as to bring the positive electrode into contact with the negative electrode. This internal short-circuiting tends to take place so as to bring about a danger of explosion.

An object of the present invention is to provide a nonaqueous electrolyte secondary battery with an improved safety.

According to a first aspect of the present invention, there is provided a nonaqueous electrolyte secondary battery, comprising an electrode group including a positive electrode, a negative electrode, and a porous separator interposed between the positive electrode and the negative electrode, the pores of the porous separator being closed when heated; a nonaqueous electrolyte held by the porous separator; and a jacket formed of a sheet including a thermoplastic resin layer forming at least a portion of the inner surface, having the electrode group housed therein, and having mutually facing regions of the thermoplastic resin layer heat-sealed to each other to seal the electrode group therein; wherein the positive electrode, the negative electrode and the separator are made integral, and the thermoplastic resin layer has a melting point higher than a pore-closing initiating temperature of the porous separator at which the pores of the separator begin to be closed.

According to a second aspect of the present invention, there is provided a nonaqueous electrolyte secondary battery, comprising an electrode group including a positive electrode, a negative electrode, and a separator made of a porous sheet interposed between the positive electrode and the negative electrode, the porous sheet being made of at least one kind of a material selected from the group consisting of polyolefin, cellulose and polyvinylidene fluoride, having an air permeability not higher than 600 seconds/100 $cm^3$, and a having a thickness of 5 to 30 $\mu m$; a nonaqueous electrolyte held by the separator; and a jacket formed of a sheet including a thermoplastic resin layer forming at least a portion of the inner surface, having the electrode group housed therein, and having mutually facing regions of the thermoplastic resin layer heat-sealed to each other to seal the electrode group therein, the negative electrode and the separator are made integral, and the thermoplastic resin layer has a melting point higher than a pore-closing initiating temperature at which the pores of the separator begin to be closed.

According to a third aspect of the present invention, there is provided a nonaqueous electrolyte secondary battery, comprising an electrode group including a positive electrode, a negative electrode, and a separator made of a porous sheet interposed between the positive electrode and the negative electrode, the porous sheet being made of at least one kind of a material selected from the group consisting of polyolefin, cellulose and polyvinylidene fluoride; a nonaqueous electrolyte held by the separator; and a jacket formed of a sheet including a polyolefin layer forming at least a portion of the inner surface, having the electrode group housed therein, and having mutually facing regions of the polyolefin layer heat-sealed to each other to seal the electrode group therein; wherein the positive electrode, the negative electrode and the separator are made integral, and the polyolefin layer has a melting point higher than a pore-closing initiating temperature at which the pores of the separator begin to be closed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a cross sectional view explaining the thickness of the positive electrode included in the nonaqueous secondary battery of the present invention;

FIG. 2 is a graph showing the relationship between the cell temperature and the cell resistance in the test for measuring the temperature at which the pores of the porous separator begin to be closed;

FIG. 3 is a plan view exemplifying a first nonaqueous electrolyte secondary battery of the present invention;

FIG. 4 is a plan view showing a jacket of the nonaqueous electrolyte secondary battery shown in FIG. 3;

DETAILED DESCRIPTION OF THE INVENTION

Figure 5:
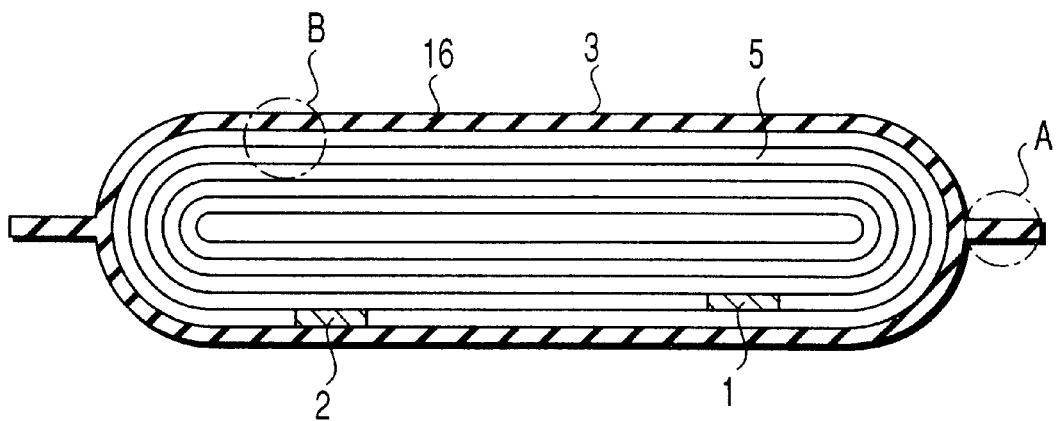
FIG. 5 is a cross sectional view along the line V—V shown in FIG. 3.

The nonaqueous electrolyte secondary battery of the present invention comprises an electrode group including a positive electrode, a negative electrode, and a porous separator interposed between the positive electrode and the negative electrode, the pores of the porous separator being closed when heated; a nonaqueous electrolyte held by the porous separator; and a jacket formed of a sheet including a thermoplastic resin layer forming at least a portion of the inner surface, having the electrode group housed therein, and having mutually facing regions of the thermoplastic resin layer heat-sealed to each other to seal the electrode group therein. It is possible for the jacket to be formed of a multi-layered sheet including a thermoplastic resin layer forming at least a portion of the inner surface. Alternatively, it is possible for the jacket to be formed of only the thermoplastic resin layer.

The positive electrode, the negative electrode and the separator are made integral. Also, the thermoplastic resin layer has a melting point higher than the temperature at which the pores of the porous separator begin to be closed.

First and second examples of the nonaqueous electrolyte secondary batteries will now be described.

<First Nonaqueous Electrolyte Secondary Battery>

In the first nonaqueous electrolyte secondary battery, the positive electrode and the separator are made integral by an adhesive polymer present in at least a part of the boundary between these positive electrode and the separator. Likewise, the negative electrode and the separator are made integral by an adhesive polymer present in at least a part of the boundary between these negative electrode and the separator. Particularly, it is desirable for the positive electrode and the separator to be made integral by an adhesive polymer dotted inside and at the boundary between the two and for the negative electrode and the separator to be made integral by the adhesive polymer dotted inside and at the boundary between the two.

1) Positive Electrode

The positive electrode is constructed such that a positive electrode layer containing an active material, a conducting agent and a binder is held on one surface or both surfaces of a collector.

Examples of the positive electrode active material are various oxides such as manganese oxide, lithium manganese composite oxide, lithium-containing nickel oxide, lithium-containing cobalt oxide, lithium-containing nickel cobalt oxide, lithium-containing iron oxide, lithium-containing vanadium oxide, and chalcogen compounds such as titanium disulfide and molybdenum disulfide. Of these materials, lithium-containing cobalt oxide (e.g., $LiCoO_2$), lithium-containing nickel cobalt oxide (e.g., $LiNi_{0.8}Co_{0.2}O_2$), and lithium manganese composite oxide (e.g., $LiMn_2O_4$) are preferably used because high voltage can be obtained.

Examples of this conducting agent are one or more types of carbon materials selected from acetylene black, carbon black, and graphite.

The binder has functions of allowing the collector to hold the active material in place and binding particles of the active material to each other As this binder, it is possible to use one or more types of polymers selected from the group consisting of polytetrafluoroethylene (PTFE), ethylene-propylenediene copolymer (EPDM), styrene-butadiene rubber (SBR), and polyvinylidene fluoride (PVdF).

It is desirable to set the mixing amount of the positive electrode active material at 80 to 95% by weight, the mixing amount of the conducting agent at 3 to 20% by weight, and the binder at 2 to 7% by weight.

It is desirable for the thickness of the positive electrode layer to fall within a range of between 10 $\mu$m and 150 $\mu$m. The thickness of the positive electrode layer represents the distance between that surface of the positive electrode layer which faces the separator and that surface of the positive electrode layer which faces the collector. For example, where a positive electrode layer P is held on each surface of the collector S as shown in FIG. 1, the distance between the surface $P_1$ of the positive electrode layer facing the separator and the surface $P_2$ of the positive electrode layer facing the collector S represents the thickness T of the positive electrode layer. It follows that where the thickness of the positive electrode layer falls within a range of between 10 $\mu$m and 150 $\mu$m, the total thickness of the positive electrode layers held on both surfaces of the collector falls within a range of between 20 $\mu$m and 300 $\mu$m. Where the thickness of the positive electrode layer is set to fall within a range of between 10 $\mu$m and 150 $\mu$m, it is possible to improve the large discharge characteristics and the cycle life. It is more desirable for the thickness of the positive electrode layer to fall within a range of between 30 $\mu$m and 100 $\mu$m. Where the thickness of the positive electrode layer falls within the particular range, the large discharge characteristics and the cycle life can be markedly improved.

For measuring the thickness of the positive electrode layer, 10 optional points apart from each other by at least 1 cm are selected for actually measuring the thickness at each point, followed by averaging the measured values to determine the thickness of the positive electrode. Where the positive electrode consists of a collector and positive electrode layers formed on both surfaces of the collector, the thickness of the positive electrode is measured after one of the positive electrode layers is removed. Then, the remaining positive electrode layer is removed from the collector for measuring the thickness of the collector. The thickness of the collector is measured at 10 optional points apart from each other by at least 1 cm, and the measured values are averaged to determine the thickness of the collector. Naturally, the difference in the thickness between the positive electrode and the collector provides the thickness of the positive electrode layer.

A porous conductive substrate or a non-porous conductive substrate can be used as the collector. It is possible to use, for example, aluminum, stainless steel or nickel for forming the conductive substrate. The thickness of the collector should desirably be set to fall within a range of between 5 and 20 $\mu$m. If the thickness falls within the particular range, it is possible to increase the mechanical strength of the positive electrode while suppressing an increase in the weight of the positive electrode.

2) Negative Electrode

The negative electrode is constructed such that a negative electrode layer containing an active material and a binder is formed on one surface or both surfaces of a collector.

An example of the active material is a carbon material which absorbs and desorbs lithium ions. Examples of this carbon material are a graphitized material and a carbonaceous material such as graphite, coke, carbon fibers, and spherical carbon, and a graphitized material and carbonaceous material obtained by heat-treating a thermosetting resin, isotropic pitch, mesophase pitch, mesophase pitch-based carbon fibers, and mesophase globules at 500 to 3000° C. Mesophase pitch-based carbon fibers are particularly preferred because the battery capacity and the charge-discharge cycle characteristics can be improved. Of these materials, it is preferable to use a graphitized material obtained by heat-treating at 2,000° C. or more and having a graphite crystals in which an interplanar spacing $d_{002}$ derived from (002) reflection is 0.340 nm or less. It is possible to greatly improve the battery capacity and large discharge characteristics of a nonaqueous electrolyte secondary battery including a negative electrode containing this graphitized material as a carbon material. The interplanar spacing $d_{002}$ is more preferably 0.336 nm or less.

The binder used in the present invention includes, for example, polytetrafluoroethylene (PTFE), polyvinylidene fluoride (PVdF), ethylene-propylenediene copolymer (EPDM), styrene-butadiene rubber (SBR), and carboxymethylcellulose (CMC).

The carbon material should be mixed in an amount of 90 to 98% by weight. Also, the binder should be mixed in an amount of 2 to 20% by weight. Particularly, it is desirable for the carbon material to be contained in an amount of 10 to 70 g/cm² on one surface in the prepared negative electrode.

The density of the negative electrode layer should desirably fall within a range of between 1.20 and 1.50 g/cm³.

It is desirable for the thickness of the negative electrode layer to fall within a range of between 10 $\mu$m and 150 $\mu$m. The thickness of the negative electrode layer represents the distance between that surface of the negative electrode layer which faces the separator and that surface of the negative electrode layer which faces the collector. Where the thickness of the negative electrode layer falls within a range of between 10 $\mu$m and 150 m, the total thickness of the negative electrode layers formed on both surfaces of the collector falls within a range of between 20 m and 300 $\mu$m. Where the thickness of the negative electrode layer is controlled to fall within a range of between 10 $\mu$m and 150 $\mu$m, it is possible to improve the large discharge characteristics and the cycle life of the secondary battery. It is more desirable for the thickness of the negative electrode layer to fall within a range of between 30 $\mu$m and 100 $\mu$m. If the thickness falls within the particular range, the large discharge characteristics and the cycle life of the secondary battery can be markedly improved.

For measuring the thickness of the negative electrode layer, 10 optional points apart from each other by at least 1 cm are selected for actually measuring the thickness at each point, followed by averaging the measured values to determine the thickness of the negative electrode. Where the negative electrode consists of a collector and negative electrode layers formed on both surfaces of the collector, the thickness of the negative electrode is measured after one of the negative electrode layers is removed. Then, the remaining negative electrode layer is removed from the collector for measuring the thickness of the collector. The thickness of the collector is measured at 10 optional points apart from each other by at least 1 cm, and the measured values are averaged to determine the thickness of the collector. Naturally, the difference in thickness between the negative electrode and the collector provides the thickness of the negative electrode layer.

As the collector, a porous conductive substrate or a conductive substrate having no pores can be used. These conductive substances can be made from, for example, copper, stainless steel, or nickel. The thickness of the collector should desirably fall within a range of between 5 and 20 $\mu$m. If the thickness falls within the particular range, it is possible to ensure a sufficiently high mechanical strength of the negative electrode while properly suppressing the weight of the negative electrode.

The negative electrode layer contains a carbon material capable of absorbing-desorbing lithium ions as described previously. In addition, it is possible for the negative electrode layer to contain a metal compound selected from the group consisting of a metal oxide, a metal sulfide, and a metal nitride, a lithium metal, and a lithium alloy.

Examples of the metal oxide are tin oxide, silicon oxide, lithium titanium oxide, niobium oxide and tungsten oxide.

Examples of the metal sulfide are tin sulfide and titanium sulfide.

Examples of the metal nitride are lithium cobalt nitride, lithium iron nitride, and lithium manganese nitride.

Further, examples of the lithium alloy are lithium aluminum alloy, lithium tin alloy, lithium lead alloy, and lithium silicon alloy.

3) Separator

The separator consists of a porous sheet in which the pores of the porous sheet are closed by heating.

The thermoplastic resin layer included in the jacket has a melting point higher than the pore-closing initiating temperature of the separator. For measuring the pore-closing initiating temperature of the separator, the electrode group is taken out by dismantling the nonaqueous electrolyte secondary battery. Then, the separator is taken out by dismantling the electrode group. The separator thus taken out is washed with an organic solvent so as to remove the impurities attached to the separator such as the nonaqueous electrolyte. Further, the separator is dried at 60° C. so as not to cause the separator to be thermally shrunk. Finally, the pore-closing initiating temperature of the separator is measured. The separator can be dried under atmospheric pressure or a reduced pressure.

The temperature at which the pores of the porous sheet begin to be closed is measured as follows. Specifically, a test cell obtained by sandwiching the separator between two electrodes each consisting of a nickel plate is dipped in a nonaqueous solution of the composition equal to that of the nonaqueous electrolyte contained in the secondary battery, followed by performing a vacuum impregnation for 1 to 15 minutes within a desiccator so as to prevent the nonaqueous solution from being evaporated. Incidentally, the electrode should be sized at 10×15 mm, ad the separator should be sized at 20×25 mm. Then, the cell is left to stand for 10 minutes at 100° C., followed by measuring the cell resistance at an AC frequency of 1 KHz and the cell temperature while heating the cell at a rate of 2° C./min. FIG. 2 is a graph exemplifying the results of the measurement. In the graph of FIG. 2, the cell temperature is plotted on the abscissa, and the cell resistance is plotted on the ordinate. As shown in FIG. 2, the cell resistance is rapidly increased at a temperature P. This temperature P is the temperature at which the pores of the porous separator begins to be closed.

In the nonaqueous electrolyte secondary battery of the present invention, the melting point of the thermoplastic resin layer of the jacket is higher than the pore-closing initiating temperature of the separator before the separator is incorporated into the electrode group, i.e., the pore-closing initiating temperature measured by the method described above before application of tension to the separator, and is also higher than the temperature at which the pores of the separator incorporated into the electrode group begin to be closed. In other words, in the nonaqueous electrolyte secondary battery of the present invention, the melting point of the thermoplastic resin layer of the jacket is higher than the temperature at which the pores of the separator begin to be closed in each of the separator before incorporation into the electrode group, the separator incorporated into the electrode group and the separator taken out by dismantling the secondary battery.

It is desirable for the pore-closing initiating temperature of the separator to be not lower than 100° C. and not higher than 150° C. If the pore-closing initiating temperature is lower than 100° C., the secondary battery impedance tends to be increased if the secondary battery is stored under an atmosphere of an ordinary temperature, e.g., about 85° C., at which the temperature is unlikely to be elevated to an abnormally high temperature, i.e., about 140° C. at which the nonaqueous electrolyte secondary battery runs reckless. On the other hand, if the pore-closing initiating temperature exceeds 150° C., the secondary battery tends to be heated to reach an abnormally high temperature, giving rise to dangers such as explosion and ignition. Preferably, the pore-closing initiating temperature should fall within a range of between 105° C. and 140° C. More preferably, the pore-closing initiating temperature should fall within a range of between 105° C. and 135° C. The pore-closing initiating temperature of the separator should be construed to be measured by the method described above after the secondary battery is dismantled by the method described above.

Tension is applied to the separator when the separator is incorporated into the electrode group so as to enlarge the pore of the separator. As a result, the pore-closing initiating temperature of the separator and the temperature at which pores of the separator incorporated into the electrode group begin to be closed tends to be higher than the pore-closing initiating temperature measured before incorporation of the separator into the electrode group by the method described above. The increase in the pore-closing initiating temperature, which depends on the material, thickness, air permeability, thermal shrinking rate, porosity, etc. of the separator, is at most 10 to 15° C. It follows that the pore-closing initiating temperature of the separator (after dismantling of the secondary battery) can be controlled to fall within a range of between 100° C. and 150° C. by setting the pore-closing initiating temperature of the separator before incorporation into the electrode group, which is measured by the method described above, to fall within a range of between 100° C. and 140° C. Also, the pore-closing initiating temperature of the separator (after dismantling of the secondary battery) can be controlled to fall within a range of between 115° C. and 150° C. by setting the pore-closing initiating temperature of the separator before incorporation into the electrode group, which is measured by the method described above, to fall within a range of between 110° C. and 135° C. Further, the pore-closing initiating temperature of the separator (after dismantling of the secondary battery) can be controlled to fall within a range of between 120° C. and 140° C. by setting the pore-closing initiating temperature of the separator before incorporation into the electrode group, which is measured by the method described above, to fall within a range of between 105° C. and 130° C.

It is possible to use, for example, a porous film or an unwoven fabric as the porous sheet providing the separator used in the present invention. It is desirable for the porous sheet to be made of at least one material selected from the group consisting of polyolefin, cellulose and polyvinylidene fluoride (PVdF). The polyolefin includes, for example, polyethylene and polypropylene. It is desirable to use a porous film containing polyethylene or polypropylene. Particularly, a porous film made of polyethylene, polypropylene or both polyethylene and polypropylene permits improving the safety of the secondary battery and, thus, is desirable.

It is desirable for the thickness of the separator to fall within a range of between 5 μm and 30 μm. If the thickness is smaller than 5 μm, it is difficult to increase sufficiently the battery resistance after the pores of the separator are closed. As a result, it takes a long time to stop the function of the battery. It is also possible for the battery to be heated to an abnormally high temperature so as to bring about explosion or ignition. Since the battery resistance after closing of the pores of the separator is increased with increase in the thickness of the separator, it is easy to stop the battery function promptly. However, if the thickness exceeds 30 μm, the weight energy density and the volume energy density of the secondary battery tend to be lowered. Preferably, the upper limit of the thickness of the separator should be 25 μm. Likewise, the lower limit of the thickness of the separator should be 10 μm.

It is desirable for the separator to exhibit an air permeability not higher than 600 seconds/100 cm$^3$. The air permeability represents the time (seconds) required for an air of 100 cm$^3$ to pass through the separator. If the air permeability exceeds 600 seconds/100 cm$^3$, it may be difficult for the separator to obtain a high lithium ion mobility. Also, the lower limit of the air permeability should desirably be 100 seconds/100 cm$^3$. If the air permeability is lower than 100 seconds/100 cm$^3$, it may be difficult to obtain a sufficient mechanical strength of the separator. Also, the pore-closing initiating temperature may possibly be increased. Preferably, the upper limit of the air permeability should be 500 seconds/100 cm$^3$, and more preferably 400 seconds/100 cm$^3$. Likewise, the lower limit of the air permeability should more desirably be 150 seconds/100 cm$^3$.

The heat shrinkage ratio of the porous sheet upon being left to stand at 120° C. for 1 hour is preferably 20% or less. If this heat shrinkage ratio exceeds 20%, it may become difficult to obtain satisfactory adhesion strength between the positive and negative electrodes and the separator. The heat shrinkage ratio is more preferably 15% or less.

The porous sheet preferably has a porosity of 30 to 60% for the reasons explained below. If the porosity is less than 30%, good electrical holding properties may become difficult to obtain in the separator. On the other hand, if the porosity exceeds 60%, no satisfactory separator strength may be obtained. A more favorable range of the porosity is 35 to 50%.

It is desirable to use as the separator a porous sheet made of at least one material selected from the group consisting of polyolefin, cellulose and polyvinylidene fluoride (PVdF), having a thickness of 5 to 30 μm, and having an air permeability not higher than 600 seconds/100 cm$^3$. When an abnormal heat or temperature elevation has taken place by the internal short-circuiting, an over-charging or by being left to stand under high temperatures not lower than 130° C., the pores of the porous separator are promptly closed. As a result, the secondary battery is prevented from reaching an abnormally high temperature, making it possible to prevent rupture and ignition without fail. Also, where the secondary battery is used under an atmosphere of an ordinary high temperature, the separator permits suppressing the elevation of the impedance. Particularly, the porous sheet preferably has a porosity of 30 to 60%. It should be noted that the pore-closing initiating temperature of the separator can be controlled at an appropriate level by defining the material, the air permeability, the thickness, and the porosity of the separator as described previously.

4) Adhesive Polymer

An adhesive polymer is present in at least a part of the boundary between the positive electrode and the separator and in at least a part of the boundary between the negative electrode and the separator. Further, it is desirable for the adhesive polymer to be held within the positive electrode, the negative electrode and the separator.

It is desirable for the adhesive polymer to exhibit a maintain a high adhesivity under the state holding a nonaqueous electrolyte. It is also desirable for the adhesive polymer to exhibit a high lithium ion conductivity. As the adhesive polymer, it is possible to use one or more types of polymers selected from the group consisting of polyacrylonitrile (PAN), polyacrylate (PMMA), polyvinylidene fluoride (PVdF), polyvinyl chloride (PVC) and polyethylene oxide (PEO). of these polymers, PVdF is most preferred. PVdF can hold the nonaqueous electrolyte in place and partially gels in the presence of the nonaqueous electrolyte. This further improves the ion conductivity of the positive electrode.

It is desirable for the adhesive polymer to assume a porous structure having fine pores within the cavities of the positive electrode, the negative electrode, and the separator. The adhesive polymer assuming a porous structure is capable of holding the nonaqueous electrolyte.

The total amount of the adhesive polymers contained in the battery including the adhesive polymer contained in the adhesive portion described later is preferably 0.1 to 6 mg per 100 mAh battery capacity for the reasons explained below. If the total amount of the adhesive polymers is less than 0.1 mg per 100 mAh battery capacity, it may become difficult to well increase the adhesion strength between the positive electrode and the separator and between the negative electrode and the separator. On the other hand, if the total amount exceeds 6 mg per 100 mAh battery capacity, the lithium ion conductivity of the secondary battery may decrease, or its internal resistance may increase. This may make it difficult to well improve the discharge capacity, large discharge characteristics, and charge/discharge cycle life. A more preferable range of the total amount of adhesive polymers is 0.2 to 1 mg per 100 mAh battery capacity.

5) Nonaqueous Electrolyte

The nonaqueous electrolyte is held by at least the separator. Particularly, it is desirable for the nonaqueous electrolyte to be dispersed over the entire electrode group. The nonaqueous electrolyte used in the present invention includes a liquid nonaqueous electrolyte, a gel nonaqueous electrolyte, and a solid nonaqueous electrolyte.

(1) Liquid nonaqueous electrolyte

The liquid nonaqueous electrolyte is impregnated in the electrode group. The liquid nonaqueous electrolyte can be obtained by dissolving a solute in a nonaqueous solvent.

It is desirable for the amount of the liquid nonaqueous electrolyte to fall within a range of between 0.2 g and 0.6 g per 100 mAh of the battery unit capacity for the reasons given below. Specifically, if the amount of the liquid nonaqueous electrolyte is less than 0.2 g/100 mAh, it may be difficult to maintain sufficiently the ionic conductivity between the positive electrode and the negative electrode. On the other hand, if the amount of the liquid nonaqueous electrolyte exceeds 0.6 g/100 mAh, the amount of the electrolyte is too large to achieve the sealing satisfactorily in the case of using a jacket made of a sheet. More preferably, the amount of the liquid nonaqueous electrolyte should fall within a range of between 0.4 and 0.55 g/100 mAh.

The known nonaqueous solvent used as a solvent in a lithium secondary battery can be used as the nonaqueous solvent. It is desirable to use a nonaqueous solvent consisting essentially of a mixed solvent containing propylene carbonate (PC) or ethylene carbonate (EC) and at least one nonaqueous solvent (hereinafter referred to as a second solvent) having a viscosity lower than that of PC or EC, though the nonaqueous solvent used in the present invention is not particularly limited.

It is desirable to use as the second solvent, for example, a chain-like carbon. Particularly, the second solvent used in the present invention includes, for example, dimethyl carbonate (DMC), methyl ethyl carbonate (MEC), diethyl carbonate (DEC), ethyl propionate, methyl propionate, γ-butyrolactone (γ-BL), acetonitrile (AN), ethyl acetate (EA), toluene, xylene, and methyl acetate (MA). These secondary solvent can be used singly or in the form of a mixture of at least two compounds. Particularly, it is desirable for the secondary solvent to have a donor number not larger than 16.5.

It is desirable for the secondary solvent to have a viscosity not larger than 28 mp at 25° C. Also, it is desirable for the mixing ratio of the ethylene carbonate or propylene carbonate in the mixed solvent to fall within a range of between 10% and 80% by volume. More preferably, the mixing ratio of the ethylene carbonate or propylene carbonate in the mixed solvent should fall within a range of between 20% and 75% by volume.

It is desirable for the solute to consist of, for example, lithium salts such as lithium perchlorate ($LiClO_4$), lithium phosphorus hexafluoride ($LiPF_6$), lithium borofluoride ($LiBF_4$), lithium arsenic hexafluoride ($LiAsF_6$), lithium trifluorometasulfonate ($LiCF_3SO_3$) and bis-trifluoromethyl sulfonylimide lithium [$LiN(CF_3SO_2)_2$]. Particularly, it is desirable to use $LiPF_6$ and $LiBF_4$.

It is desirable for the solute given above to be dissolved in the nonaqueous solvent in an amount of 0.5 to 2.0 mol/L (liter).

It is particularly desirable to prepare a liquid nonaqueous electrolyte by dissolving the solute, e.g., lithium salt, in a mixed nonaqueous solvent containing γ-butyrolactone (BL) such that BL is contained in the mixed nonaqueous solvent in an amount falling within a range of between 40% by volume and 95% by volume based on the total amount of the mixed nonaqueous solvent. It is desirable for the mixed nonaqueous solvent to contain the largest amount of BL. If the BL content is lower than 40% by volume, a gas is likely to be generated under high temperatures. Also, where the mixed nonaqueous solvent contains both BL and a cyclic carbonate, the ratio of the cyclic carbonate is rendered relatively high, with the result that the viscosity of the solvent tends to be increased markedly. If the viscosity of the solvent is increased, the electric conductivity and the permeability of the liquid nonaqueous electrolyte are lowered so as to impair the charge/discharge cycle characteristics, the large discharge characteristics, and the discharge characteristics under an environment of a low temperature around −20° C. On the other hand, if the BL content exceeds 95% by volume, the reaction between the negative electrode and BL is likely to take place, with the result that the charge/discharge cycle characteristics tend to be impaired. To be more specific, if the negative electrode containing, for example, a carbon material capable of absorbing and desorbing lithium ions is reacted with BL to bring about a reducing decomposition of the nonaqueous electrolyte, a film inhibiting the charge-discharge reaction is formed on the surface of the negative electrode. As a result, a current concentration tends to take place in the negative electrode so as to bring about undesirable phenomena. For example, lithium metal is precipitated on the surface of the negative electrode. Alternatively, an impedance is increased at the interface of the negative electrode so as to lower the charge-discharge efficiency of the negative electrode and to impair the charge-discharge cycle characteristics. Preferably, the BL content of the nonaqueous solvent should fall within a range of between 60% and 90% by volume. Where the BL content of the nonaqueous solvent falls within the range specified in the present invention, the gas generation during storage of the secondary battery under high temperatures can be suppressed more effectively. Also, it is possible to further improve the discharge capacity under low temperatures about −20° C. More preferably, the BL content of the nonaqueous solvent should fall within a range of between 75% by volume and 90% by volume.

It is desirable to use a cyclic carbonate together with BL in the present invention because the cyclic carbonate permits improving the charge-discharge efficiency.

The cyclic carbonate used in the present invention includes, for example, propylene carbonate (PC), ethylene carbonate (EC), vinylene carbonate (VC), and trifluoropropylene carbonate (TFPC). Particularly, if EC is used together with BL, the charge-discharge characteristics and the large discharge characteristics can be markedly improved. It is also desirable to prepare a mixed solvent by mixing BL with at least one kind of a third solvent selected from the group consisting of PC, VC, TFPC, diethyl carbonate (DEC), methyl ethyl carbonate (MEC) and an aromatic compound. The mixed solvent of the particular construction permits improving the charge-discharge cycle characteristics.

In order to decrease the viscosity of the mixed solvent, it is possible for the nonaqueous solvent containing BL to further contain 20% by volume or less of a solvent having a low viscosity selected from the group consisting of, for example, a chain carbonate, a chain ether, and a cyclic ether.

Preferred combinations of the nonaqueous solvents used in the present invention include, for example, a combination of BL and EC, a combination of BL and PC, a combination of BL, EC and DEC, a combination of BL, EC and MEC, a combination of BL, EC, MEC and VC, a combination of BL, EC and VC, a combination of BL, PC and VC, and a combination of BL, EC, PC and VC. In this case, it is desirable to set the mixing ratio of EC to fall within a range of between 5 an 40% by volume. It should be noted in this connection that, if the mixing amount of EC is smaller than 5% by volume, it is difficult to cover densely the surface the surface of the negative electrode with a protective film, giving rise to a possibility that a reaction may take place between the negative electrode and BL. As a result, it is difficult to improve sufficiently the charge-discharge cycle characteristics. On the other hand, if the mixing amount of EC exceeds 40% by volume, the viscosity of the nonaqueous electrolyte is unduly increased so as to lower the ionic conductance. As a result, it is difficult to improve sufficiently the charge-discharge cycle characteristics, the large discharge characteristics and the low temperature discharge characteristics. More preferably, the EC amount should fall within a range of between 10 and 35% by volume. Also, it is desirable for at least one of the solvents selected from the group consisting of DEC, MEC and VC to fall within a range of between 0.5 and 10% by volume.

The solutes similar to those enumerated previously can be used in the present invention. Particularly, it is desirable to use $LiPF_6$ or $LiBF_4$. The solute should desirably be dissolved in the nonaqueous solvent in an amount of 0.5 to 2.0 mol/L.

It is possible to add a surfactant such as trioctyl phosphate in an mount of 0.1 to 1% to the liquid nonaqueous electrolyte containing γ-BL in order to improve the wettability of the liquid nonaqueous electrolyte with the separator.

(2) Gel nonaqueous electrolyte

The gel nonaqueous electrolyte is present inside the separator, at the boundary between the separator and the positive electrode and at the boundary between the separator and the negative electrolyte.

The gel nonaqueous electrolyte is prepared by mixing a polymer, a nonaqueous solvent and a solute.

The polymer is at least one kind of polymer selected from the group consisting of polyvinylidene fluoride (PVdF), polyacrylonitrile (PAN), polyethylene oxide (PEO), polyvinyl chloride (PVC) and polyacrylate (PMMA). On the other hand, the nonaqueous solvents and the solutes described previously can be used for preparing the gel nonaqueous electrolyte.

The gel nonaqueous electrolyte also performs the function of the adhesive polymer serving to make integral the positive electrode, the negative electrode and the separator. Therefore, in the case of using the gel nonaqueous electrolyte, it is unnecessary to add the adhesive polymer described previously in item 4).

(3) Solid nonaqueous electrolyte

The solid nonaqueous electrolyte is present inside the separator, at the boundary between the separator and the positive electrode and at the boundary between the separator and the negative electrode.

The solid nonaqueous electrolyte consists of a mixture of, for example, a polymer such as polyethylene oxide (PEO) and a lithium salt. The lithium salts described previously under the heading of "Liquid nonaqueous electrolyte" can be used for preparing the solid nonaqueous electrolyte.

The solid nonaqueous electrolyte also performs the function of the adhesive polymer serving to make integral the positive electrode, the negative electrode and the separator. Therefore, in the case of using the solid nonaqueous electrolyte, it is unnecessary to add the adhesive polymer described previously in item 4).

6) Jacket

The electrode group and the nonaqueous electrolyte held by the electrode group are sealed in the jacket. The jacket is formed of a sheet having a thermoplastic resin layer forming at least a periphery of the sheet or two sheets each having a thermoplastic resin layer forming at least a periphery of the sheet. The thermoplastic resin layer has a melting point higher than a pore-closing initiating temperature of the porous separator at which the pores of the separator begin to be closed. For forming the jacket from one sheet, the sheet is folded, then, the mutually facing portions of the thermoplastic resin layer of the sheet are heat sealed so as to form closed housing. On the other hand, for forming the jacket from two sheets, the two sheets are superposed one upon the other, then, the mutually facing portions of the thermoplastic resin layer of the sheet are heat sealed so as to form closed housing. Where a lead extends from within the jacket, the mutually facing portions of the thermoplastic resin layer are heat sealed with the lead interposed therebetween.

FIGS. 3 and 4 collectively show how to seal the electrode group with the jacket. Specifically, prepared are an electrode group having a positive electrode lead 1 and a negative electrode lead 2 and a rectangular sheet 3 having a thermoplastic resin layer forming at least a periphery 4 of the sheet 3. The periphery region 4 is shaded in the drawing (FIG. 4). The rectangular sheet is folded along a line passing through the center of the sheet and parallel to one side of the sheet.

In this case, the thermoplastic resin layer of the sheet 3 is positioned inside. The electrode group is covered with the sheet 3, such that the positive electrode lead 1 and the negative electrode lead 2 extend out of the sheet 3. Then, an open portion extending in the longitudinal direction of the sheet 3 and an opening portion through which extend the leads 1 and 2 are heat sealed. Incidentally, it is also possible to fold the sheet 3 as described previously, followed by heat sealing the both edge portions in the longitudinal direction of the sheet 3, thereby shaping the sheet 3 into a bag. Then, the electrode group is housed in the bag, and the open portion through which extends the positive electrode lead 1 and the negative electrode lead 2 are heat sealed, thereby achieving a desired sealing.

If the melting point of the thermoplastic resin layer is lower than the pore-closing initiating temperature of the separator at which the pores of the porous separator begins to be closed, the thermoplastic resin is melted again before the pores of the porous separator are closed in the event of the abnormal heat generation or temperature elevation by the internal short-circuiting, an over-charging or by being left to stand at a high temperature not lower than 130° C., so as to impair the hermetic properties of the jacket. As a result, the electrode group, in which battery reactions are being carried out vigorously, is exposed to the air atmosphere. It follows that a reaction takes place between the water within the air and lithium so as to give rise to a rapid heat generation, leading to ignition. The pore-closing initiating temperature of the separator should be construed to be measured by the method described above after the secondary battery is dismantled by the method described above.

The thermoplastic resins used in the present invention include, for example, polyolefins such as polyethylene and polypropylene. A single kind of the thermoplastic resin selected from the thermoplastic resins described previously can be used in the present invention. Alternatively, a mixture of at least two kinds of the thermoplastic resins such as polyethylene and polypropylene can also be used in the present invention. The melting points of the polyolefins differ depending on the crystallinity. Therefore, it is desirable to use a polyolefin having a desired melting point as the thermoplastic resin. Particularly, it is desirable to use polypropylene having a melting point not lower than 150° C. or a thermoplastic resin consisting of a mixture of polypropylene having a melting point not lower than 150° C. and polyethylene in order to increase the sealing strength.

It is desirable for the thermoplastic resin to have a melting point not lower than 120° C. If the melting point is lower than 120° C., the thermoplastic resin tends to be melted when the secondary battery is stored under an atmosphere of an ordinary high temperature, e.g., about 85° C., that does not reach an abnormally high temperature, with the result that the hermetic properties of the jacket tend to be impaired. More preferably, the melting point of the thermoplastic resin should be not lower than 140° C. Incidentally, the temperature in the heat sealing the open portion of the jacket should be higher than the melting point of the thermoplastic resin to increase the productivity. The hermetic properties under a high temperature are increased with increase in the melting point of the thermoplastic resin. However, the sealing temperature is also increased. If the melting point exceeds 200° C., the nonaqueous electrolyte is deteriorated by the heat applied in the heat sealing step, or the separator tends to be thermally shrunk. Such being the situation, it is desirable to set the upper limit of the melting point at 250° C. More preferably, the upper limit of the melting point should be 220° C.

It is desirable for a temperature difference between the pore-closing initiating temperature of the separator and the melting point of the thermoplastic resin layer of the jacket to be not smaller than 5° C. If the temperature difference is smaller than 5° C., the thermoplastic resin layer in the sealing region of the jacket tends to be melted before the pores of the separator are closed to stop the charge-discharge reaction. It is more desirable for the temperature difference to be not smaller than 20° C. The pore-closing initiating temperature should be construed to be measured by the method described above after the secondary battery is dismantled by the method described above.

The specific examples of the jacket is a sheet prepared by integrally arranging protective layers on both surfaces of a metal layer. The metal layer serves to shield water. The metal layer can be formed of, for example, aluminum, stainless steel, iron, copper, and nickel. Particularly, it is desirable for the metal layer to be formed of aluminum that is light in weight and exhibits a high performance of shielding water. It is possible for the metal layer to consist of a single kind of metal. Alternatively, a plurality of different metal layers can be made integral to form the desired metal layer. The outer protective layer of the jacket serves to prevent damage from being done to the metal layer. It is desirable for the outer protective layer to formed of at least one kind of a resin selected from the group consisting of polyethylene and polypropylene. On the other hand, the inner protective layer of the jacket serves to prevent the metal layer from being corroded by the nonaqueous electrolyte. Also, a part of the inner protective layer acts as a sealing region. It is possible for the inner protective layer to be formed of only the thermoplastic resin described previously. Alternatively, the surface region alone of the inner protective layer may be formed of the particular thermoplastic resin. Where the inner protective layer is formed of thermoplastic resins, a plurality of different kinds of thermoplastic resin layers may be made integral to provide the inner protective layer.

The thickness of the jacket should desirably be not larger than 500 $\mu$m. If the thickness exceeds 500 $\mu$m, the capacity per unit weight of the battery tends to be lowered. It is desirable for the thickness of the jacket to be not larger than 300 $\mu$m, more preferably not larger than 250 $\mu$m, and most preferably not larger than 150 $\mu$m. On the other hand, if the thickness of the jacket is smaller than 50 $\mu$m, the jacket tends to be deformed or broken. Naturally, it is desirable for the lower limit in the thickness of the jacket to be 50 $\mu$m. To be more specific, the lower limit in the thickness of the jacket should more desirably be 80 $\mu$m, and should most desirably be 100 $\mu$m.

For measuring the thickness of the jacket, three optional points apart from each other by at least 1 cm are selected within a region excluding the sealing region of the jacket, and the thickness in each of these three points is actually measured. The measured values are averaged to determine the thickness of the jacket. If a foreign matter such as a resin is attached to the surface of the jacket, the thickness is measured after removal of the foreign matter. For example, where PVdF is attached to the surface of the jacket, the PVdF is removed by wiping off the surface of the jacket with a dimethylformamide solution, followed by measuring the thickness of the jacket.

When this film jacket is used, the electrode group is desirably adhered to the inner surface of the jacket by an adhesive layer formed on at least a portion of the surface of the electrode group. With this arrangement, the jacket can be fixed to the surface of the electrode group. So, it is possible to prevent the nonaqueous electrolyte from permeating into the boundary between the electrode group and the jacket.

It is desirable for the first nonaqueous electrolyte secondary battery to have a product of the battery capacity (Ah) and the battery inner impedance (mΩ) at 1 kHz falling within a range of between 10 mΩ·Ah and 110 mΩ·Ah. By setting the product between the battery capacity and the impedance to fall within the range noted above, the large discharge characteristics and the charge-discharge cycle characteristics can be further improved. Incidentally, the battery capacity noted above represents a nominal battery capacity or a discharge capacity when discharged at 0.2 C. Preferably, the product between the battery capacity and the impedance should fall within a range of between 20 mΩ·An and 60 mΩ·Ah.

A thin lithium ion secondary battery as an example of the first nonaqueous electrolyte secondary battery will now be described in detail with reference to FIGS. 3 to 7.

Figure 6:
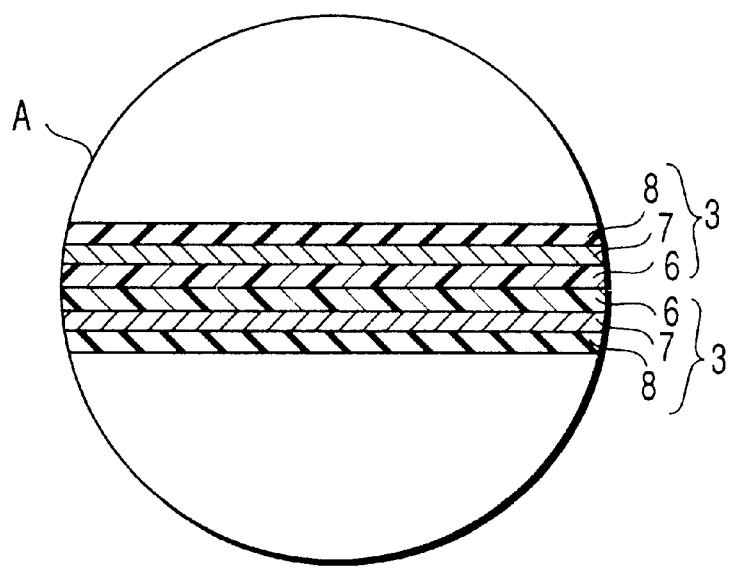
FIG. 6 is a cross sectional view showing in a magnified fashion a portion A shown in FIG. 5.
Figure 7:
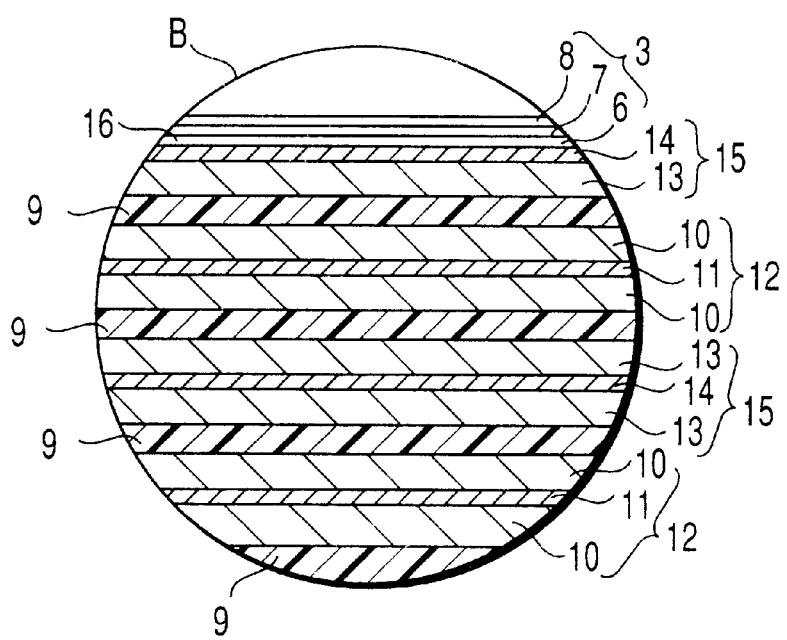
FIG. 7 is a cross sectional view showing in a magnified fashion a portion B shown in FIG. 5.
Figure 8:
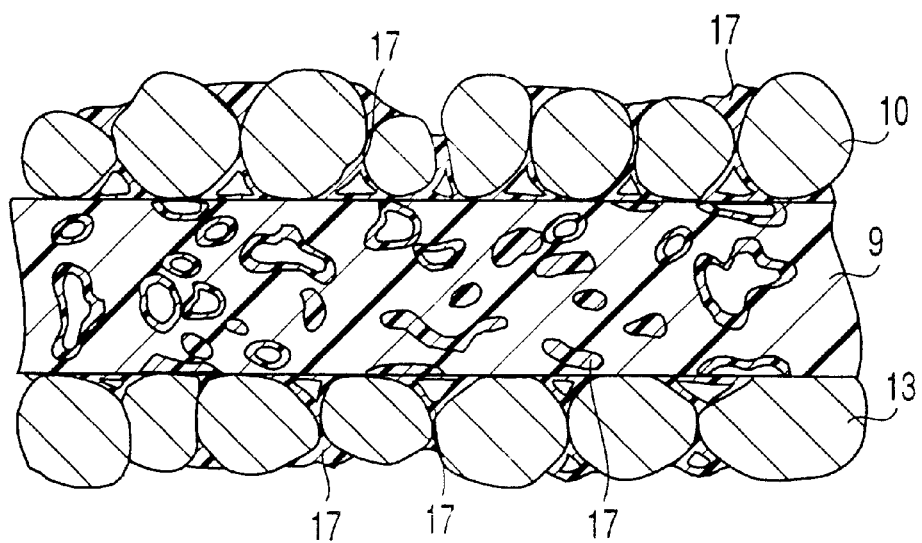
FIG. 8 schematically shows the boundary region among the positive electrode, the separator and the negative electrode in the secondary battery shown in FIG. 3.

Specifically, FIG. 5 is a cross sectional view along the line V—V of the thin lithium secondary battery shown in FIG. 3, FIG. 6 is a cross sectional view showing in a magnified fashion a portion A shown in FIG. 5, and FIG. 7 is a cross sectional view showing in a magnified fashion a portion B shown in FIG. 5. FIG. 8 schematically shows the boundary region among the positive electrode layer, the separator and the negative electrode layer included in the secondary battery shown in FIG. 5.

An electrode group 5 having the positive electrode lead 1 and the negative electrode lead 2 is housed in the jacket 3 such that the positive electrode lead 1 and the negative electrode lead 2 extend out of the jacket 3. As shown in, for example, FIG. 6, the jacket 3 consists of a laminate film including a thermoplastic resin layer 6, a metal layer 7 laminated on the thermoplastic resin layer 6, and an outer protective layer 8 laminated on the metal layer 7. It follows that the entire inner surface of the jacket 3 is formed of a thermoplastic resin. The electrode group 5 is prepared by spirally winding a laminate structure consisting of the positive electrode, the separator and the negative electrode in a flattened shape. As shown in FIG. 7, the laminate structure providing the electrode group 5 comprises a separator 9; a positive electrode 12 including a positive electrode layer 10 and a positive electrode collector 11; the separator 9; a negative electrode 15 including a negative electrode layer 13, a negative electrode collector 14 and another negative electrode layer 13; the separator 9; the positive electrode 12 including the positive electrode layer 10 and the positive electrode collector 11; the separator 9; and the negative electrode 15 including the negative electrode layer 13 and the negative electrode collector 14, which are laminated in the order mentioned starting with the lowermost separator 9. The negative electrode collector 14 is positioned to constitute the outermost layer of the electrode group 5. An adhesive portion 16 is present on the surface of the electrode group 5. The inner surface of the jacket 3 except the sealing region 4 is bonded to the adhesive portion 16. As shown in FIG. 8, an adhesive polymer 17 is held in the clearances of the positive electrode layer 10, the separator 9 and the negative electrode layer 13. The positive electrode 12 and the separator 9 are bonded to each other by the adhesive polymer 17 dotted inside these positive electrode and separator and between the positive electrode 10 and the separator 9. On the other hand, the negative electrode 15 and the separator 9 are bonded to each other by the adhesive polymer 17 dotted inside these negative electrode 15 and separator 9 and between the negative electrode 15 and the separator 9. The liquid nonaqueous electrolyte is impregnated in the electrode group 5. The terminal of the positive electrode lead 1 is connected to the positive electrode collector 11. On the other hand, the terminal of the negative electrode lead 2 is connected to the negative electrode collector 14.

In the arrangement shown in FIG. 5, the adhesive portion 16 is formed on the entire surface of the electrode group 5. Alternatively, it is also possible to form the adhesive portion 16 to cover a part of the surface of the electrode group 5. Where the adhesive portion 16 is formed to cover a part of the surface of the electrode group 5, it is desirable to form the adhesive portion 16 at a surface corresponding to at least the outermost circumferential surface of the electrode group. Incidentally, it is possible to omit the adhesive portion 16.

The first nonaqueous electrolyte secondary battery of the present invention can be manufactured by the method described below, though the manufacturing method is not limited to that described below as far as the manufacturing method falls within the technical scope of the present invention.

<Manufacturing Method (I)>

(First step)

A porous sheet used as a separator is interposed between positive and negative electrodes to form an electrode group.

This electrode group is desirably formed by any of: spirally winding positive and negative electrodes with a separator not containing an adhesive polymer interposed therebetween; spirally winding a positive electrode and a negative electrode with a separator not containing an adhesive polymer interposed between them and compressing the spiral or coil in the direction of the diameter; and folding positive and negative electrodes a plurality of times with a separator not containing an adhesive polymer interposed between them. When the electrode group is formed any of these methods, in a second step (to be described later), it is possible to allow a solution of an adhesive polymer to permeate the positive electrode, the negative electrode and the separator and, at the same time, prevent this solution from permeating the whole boundary between the positive electrode and the separator and the whole boundary between the negative electrode and the separator. Consequently, the adhesive polymer can be dispersedly present in the positive electrode, the negative electrode and the separator and can be dispersedly present in a boundary between the positive electrode and the separator and in a boundary between the negative electrode and the separator.

The positive electrode is formed by suspending an active material, conducting agent, and binder in an appropriate solvent, coating a collector with this suspension, drying the collector to form a thin plate. Examples of the active material, conducting agent, and collector are materials similar to those enumerated above in the explanation of 1) Positive electrode.

The negative electrode is formed by kneading a carbon material which absorbs and desorbs lithium ions and binder in the presence of a solvent, coating a collector with the resultant suspension, drying the collector, and pressing the collector once or 2 to 5 times with desired pressure. Examples of the carbon material, binder, and collector are materials similar to those enumerated above in the explanation of 2) Negative electrode.

The separator not containing an adhesive polymer is made of, for example, a porous sheet. Examples of the porous sheet are materials similar to those enumerated above in the explanation of 3) Separator.

(Second step)

A sheet including a sealing region made of a thermoplastic material is prepared as a jacket, and the sheet is worked into a bag by heat sealing. The electrode group is housed in the bag such that the laminated surface can be seen from the open portion of the bag. Further, a solution prepared by dissolving an adhesive polymer in a solvent is poured into the electrode group through the open portion of the bag so as to permit the solution to permeate the electrode group.

Examples of the jacket are materials similar to those enumerated above in the explanation of 6) Jacket. Also, examples of the adhesive polymer are materials similar to those enumerated above in the explanation of 4) Adhesive polymer. It is particularly desirable to use PVdF as the adhesive polymer.

The solvent is desirably an organic solvent having a boiling point of 200° C. or less. Dimethylformamide (boiling point 153° C.), is an example of this organic solvent. If the boiling point of the organic solvent exceeds 200° C., a long drying time may be necessary when the temperature of drying (to be described later) is set at 100° C. or less. The lower limit of the organic solvent boiling point is preferably 50° C. If the organic solvent boiling point is lower than 50° C., the organic solvent may evaporate while the solution is injected into the electrode group. The upper limit of the boiling point is more preferably 180° C., and its lower limit is more preferably 100° C.

The concentration of the adhesive polymer in the solution is preferably 0.05 to 2.5% by weight for following reasons. If the concentration is less than 0.05% by weight, it may become difficult to bonding between the positive electrode and the separator, and between the negative electrode and the separator, with sufficient strength. On the other hand, if the concentration exceeds 2.5% by weight, it may be difficult to obtain porosity large enough to hold the nonaqueous electrolyte in place, and the interface impedance of the electrode may increase. If the interface impedance increases, the capacity and the large discharge characteristics greatly degrade. A more favorable range of the concentration is 0.1 to 1.5% by weight.

When the concentration of the adhesive polymer in the solution is 0.05 to 2.5% by weight, the injection amount of solution is preferably 0.1 to 2 mL per 100 mAh battery capacity for the following reasons. If the injection amount is smaller than 0.1 mL, it may become difficult to well improve the adhesion strength between the positive electrode and the separator and between the negative electrode and the separator. On the other hand, if the injection amount exceeds 2.5% by weight, the lithium ion conductivity of the secondary battery may decrease, or its internal resistance may increase. This may make it difficult to improve the discharge capacity, large discharge characteristics, and charge-discharge cycle life. A more favorable range of the injection amount is 0.15 to 1 mL per 100 mAh battery capacity.

(Third step)

The adhesive polymer are allowed to be present within the cavities of the positive electrode, the negative electrode and the separator by heating the electrode group while pressing the electrode group to a predetermined thickness under a reduced pressure including vacuum or an atmospheric pressure so as to evaporate the solvent within the solution. In this step, the positive electrode and the separator are bonded to each other by the adhesive polymer dotted inside and at the boundary between the positive electrode and the separator, and the negative electrode and the separator are bonded to each other by the adhesive polymer dotted inside and at the boundary between the negative electrode and the separator. Also, the water contained in the electrode group can be removed simultaneously by the heating. It is acceptable for the electrode group to contain traces of the solvent.

It is desirable to perform the heating at a temperature not higher than 100° C. If the heating temperature exceeds 100° C., the separator tends to be thermally shrunk markedly. If the separator is markedly shrunk, the porosity of the separator is diminished, leading to deterioration of the battery characteristics. The thermal shrinkage tends to take place prominently where a porous film containing polyethylene or polypropylene is used as the separator. The thermal shrinkage of the separator can be suppressed with decrease in the heating temperature. If the heating temperature is lowered to a level lower than 40° C., however, it may be difficult to evaporate the solvent sufficiently. Under the circumstances, it is desirable to perform the heating at temperatures falling within a range of between 40° C. and 100° C.

(Fourth step)

After the liquid nonaqueous electrolyte is poured into the electrode group housed in the jacket, the open portion of the jacket is heat sealed so as to finish assembling a thin nonaqueous electrolyte secondary battery.

Examples of the liquid nonaqueous electrolyte are materials similar to those enumerated above in the explanation of 5) Nonaqueous electrolyte.

In the manufacturing method described above, the solution prepared by dissolving the adhesive polymer in a solvent was poured after the electrode group was housed in the jacket. However, the solution may be poured without allowing the electrode group to be housed in the jacket. In this case, the electrode group is prepared first by interposing the separator between the positive electrode and the negative electrode. After the electrode group thus prepared is impregnated with the solution, the electrode group is heated and dried while being pressed so as to evaporate the solvent of the solution and, thus, to allow the adhesive polymer to be present within the cavities of the positive electrode, the negative electrode and the separator. Further, the electrode group is housed in the jacket, followed by pouring a nonaqueous electrolyte into the jacket and subsequently sealing the open portion of the jacket, thereby manufacturing a thin nonaqueous electrolyte secondary battery. It is possible to coat the outer circumferential surface of the electrode group with an adhesive before the electrode group is housed in the jacket so as to permit the electrode group to be bonded strongly to the jacket.

(Fifth step)

An initial charging is applied to the secondary battery thus assembled. In the initial charging step, it is desirable to set the temperature at 30° C. to 80° C. and to set the charging rate at 0.05 C to 0.5 C. It is possible to apply a single cycle of the charging under the temperature and the charging rate noted above. Alternatively a plurality of cycles of the charging may be applied under the temperature and the charging rate noted above. It is also possible to store the secondary battery at 30° C. to 80° C. for 1 to 20 hours before the initial charging step.

Incidentally, the charging rate of 1 C denotes the current value required for charging the battery to the nominal capacity (Ah) in one hour.

The temperature for the initial charging is set to fall within the range noted above for the reasons given below. If the initial charging is performed at a temperature lower than 30° C., the liquid nonaqueous electrolyte maintains a high viscosity, making it difficult for the liquid nonaqueous electrolyte to permeate uniformly the positive electrode, the negative electrode and the separator. As a result, the internal impedance tends to be increased, and the utilization rate of the active material tends to be lowered. On the other hand, if the initial charging is performed at a temperature exceeding 80° C., the binder contained in the positive electrode and the negative electrode tends to be deteriorated.

If the charging rate in the initial charging step is set to fall within a range of between 0.05 C and 0.5 C, the expansion of the positive and negative electrodes accompanying the charging can be retarded appropriately, making it possible to allow the nonaqueous electrolyte to permeate the positive and negative electrodes uniformly.

If the initial charging is performed at a charging rate of 0.05 to 0.5 C under temperatures of 30 to 80° C., the liquid nonaqueous electrolyte is allowed to be impregnated uniformly within the cavities of the electrodes and the separator. As a result, the internal impedance of the nonaqueous electrolyte secondary battery at 1 kHz can be diminished, making it possible to allow the product between the battery capacity and the internal impedance to fall within a range of between 10 mΩ·Ah and 110 mΩ·Ah. It follows that, since the utilization rate of the active material can be increased, the substantial battery capacity can be increased. It is also possible to improve the charge-discharge cycle characteristics and the large discharge characteristics of the battery.

<Second Nonaqueous Electrolyte Secondary Battery>

The second nonaqueous electrolyte secondary battery comprises:

an electrode group including a positive electrode, a negative electrode and a porous separator interposed between the positive and negative electrodes and having the pores closed by heating;

a nonaqueous electrolyte held by the separator; and a jacket formed of a sheet including a thermoplastic resin layer forming at least a portion of the inner surface, having the electrode group housed therein, and having mutually facing regions of the thermoplastic resin layer heat-sealed to each other to seal the electrode group therein. It is possible for the jacket to be formed of a multi-layered sheet including a thermoplastic resin layer forming at least a portion of the inner surface. Alternatively, it is possible for the jacket to be formed of only the thermoplastic resin layer.

The positive electrode, the negative electrode and the separator are made integral by thermally curing a binder contained in the positive and negative electrode. Also, the thermoplastic resin layer has a melting point higher than the pore-closing initiating temperature of the porous separator at which the pores of the porous separator begin to be closed.

The positive electrode, the negative electrode and the separator are equal to those used in the first nonaqueous electrolyte secondary battery described previously, except that an adhesive polymer is not contained in these electrodes and the separator. On the other hand, the nonaqueous electrolyte and the jacket included in the second nonaqueous electrolyte secondary battery are equal to those used in the first nonaqueous electrolyte secondary battery described previously.

In the second nonaqueous electrolyte secondary battery, it is desirable for the product between the battery capacity (Ah) and the battery internal impedance (mΩ) at 1 kHz to fall within a range of between 10 mΩ·Ah and 110 mΩ·Ah. If the product between the battery capacity and the impedance is set to fall within the range noted above, it is possible to improve the large discharge characteristics and the charge-discharge cycle characteristics. Incidentally, the battery capacity represents the nominal capacity or the discharge capacity in discharging the battery at 0.2 C. More preferably, the product between the battery capacity and the battery internal impedance should fall within a range of between 20 mΩ·Ah and 60 mΩ·Ah.

The second nonaqueous electrolyte secondary battery can be manufactured by, for example, the manufacturing method (II) described below.

<Manufacturing Method II>

(First step)

An electrode group is formed by any of methods (a) to (c) given below.

(a) Positive and negative electrodes are spirally wound with a separator interposed therebetween.

(b) Positive and negative electrodes are spirally wound with a separator interposed therebetween, and the coil is compressed in the direction of the diameter.

(c) Positive and negative electrodes are folded twice or more with a separator interposed therebetween.

(Second step)

Prepared is a jacket consisting of a sheet having a sealing region made of a thermoplastic resin, and the sheet is formed into a bag by heat sealing. The electrode group noted above is housed in the bag thus prepared.

(Third step)

The electrode group is molded while being heated to 40 to 120° C.

This molding is desirably performed such that the electrode group is compressed in a direction of the diameter if it is formed by method (a), and is compressed in a direction of stacking if it is formed by method (b) or (c).

The molding can be performed by press molding or forcing into a mold.

The electrode group is heated when it is molded for the reasons explained below. In the electrode group, the separator contains no adhesive polymer. If this electrode group is molded at room temperature, spring back occurs after the molding, i.e., gaps are formed between the positive electrode and the separator and between the negative electrode and the separator. As a result, the contact areas between the positive electrode and the separator and between the negative electrode and the separator are decreased. When the electrode group is molded at 40° C. or higher, the binders contained in the positive and negative electrodes can be thermally set, with the result that the hardness of the electrode group can be increased. Since this suppresses the spring back after the molding, the contact areas between the positive electrode and the separator and between the negative electrode and the separator can be increased. Also, the large contact areas can be maintained even if the charge-discharge cycles are repeated. On the other hand, if the temperature of the electrode group exceeds 120° C., the separator may greatly shrink thermally. The temperature is more preferably 60 to 100° C.

The molding by heating to a specific temperature described above can be performed at normal pressure or reduced pressure or in a vacuum. This heat molding is desirably performed at reduced pressure or in a vacuum because the efficiency of water removal from the electrode group can be improved.

When the molding is performed by press molding, the pressure is preferably set to fall within a range of between 0.01 and 20 kg/cm² for the following reasons. If the pressure is lower than 0.01 kg/cm², it is difficult to suppress the spring back amount after the molding step. If the pressure is higher than 20 kg/cm², however, the porosity of the electrode group tends to be lowered. As a result, the electrode group may fail to retain a sufficiently large amount of the nonaqueous electrolyte.

(Fourth step)

After a liquid nonaqueous electrolyte is poured into the electrode group housed in the jacket, the open portion of the jacket is heat sealed so as to finish assembling the second nonaqueous electrolyte secondary battery.

In the manufacturing method described above, the electrode group was housed first in the jacket, followed by molding the electrode group while heating the electrode group to a predetermined temperature. Alternatively, it is also possible to mold the electrode group under heating before the electrode group is housed in the jacket. In this case, the electrode group is prepared first by the first step described previously. Then, the electrode group is molded while heating the electrode group to 40 to 120° C., followed by housing the electrode group in the jacket. Further, a liquid nonaqueous electrolyte is poured into the jacket, and the open portion of the jacket is sealed so as to assemble the second nonaqueous electrolyte secondary battery.

(Fifth step)

An initial charging is applied to the assembled secondary battery as described previously. In the initial charging step, it is desirable to set the temperature to fall within a range of between 30° C. and 80° C. and to set the charging rate to fall within a range of between 0.05 C and 0.5 C. It is possible to apply a single cycle of the charging under the temperature and the charging rate noted above. Alternatively, a plurality of cycles of the charging may be applied under the temperature and the charging rate noted above. It is also possible to store the secondary battery under 30° C. to 80° C. for 1 to 20 hours before the initial charging step.

The temperature for the initial charging and the charging rate for the initial charging are set to fall within the ranges noted above for the reasons described previously.

If the initial charging is performed under a temperature of 30 to 80° C. and at a charging rate of 0.05 to 0.5 C, the liquid nonaqueous electrolyte can be impregnated uniformly within the cavities of the electrodes and the separator, making it possible to diminish the internal impedance of the nonaqueous electrolyte secondary battery at 1 kHz. As a result, the product between the battery capacity and the internal impedance at 1 kHz can be controlled to fall within a range of between 10 mΩ·Ah and 110 mΩ·Ah. As a result, the utilization rate of the active material can be increased so as to increase the substantial capacity of the battery. It is also possible to improve the charge-discharge cycle characteristics and the large discharge characteristics of the battery.

As described above in detail, the nonaqueous electrolyte secondary battery of the present invention comprises an electrode group including a positive electrode, a negative electrode and a porous separator interposed between the positive and negative electrodes and having the pores closed by heating; a nonaqueous electrolyte held by the separator; and a jacket formed of a sheet including a thermoplastic resin layer forming at least a portion of the inner surface, having the electrode group housed therein, and having mutually facing regions of the thermoplastic resin layer heat-sealed to each other to seal the electrode group therein. The positive electrode, the negative electrode and the separator are made integral. Also, the thermoplastic resin layer has a melting point higher than the pore-closing initiating temperature of the separator at which the pores of the separator begins to be closed.

If an abnormal heat generation or temperature elevation are caused within the secondary battery of the particular construction by the internal short-circuiting, an overcharging or by being left to stand at high temperatures not lower than 130° C., the pores of the separator are closed before the thermoplastic resin included in the jacket is melted. As a result, migration of lithium ions within the separator is inhibited under a relatively high pressure inside the jacket exhibiting high hermetic properties, making it possible to stop the battery reaction. It follows that it is possible to avoid the temperature elevation, making it possible to avoid in advance the explosion or ignition. In other words, the safety can be ensured.

In the secondary battery of the present invention, the lithium ion mobility within the separator can be improved by setting the air permeability of the separator at 600 seconds/100 cm$^3$ or less. As a result, the large discharge characteristics can be improved while ensuring the safety.

In the secondary battery of the present invention, the electrical resistance after the pores of the separator are closed can be increased by setting the thickness of the separator to fall within a range of between 5 $\mu$m and 30 $\mu$m, making it possible to stop the battery function promptly. As a result, the temperature elevation can be further suppressed, leading to a further improvement in safety. At the same time, it is possible to increase the weight energy density and the volume energy density.

In the secondary battery of the present invention, the pores of the separator can be closed promptly in the event of a rapid temperature elevation by setting the pore-closing initiating temperature of the separator to fall within a range of between 100° C. and 150° C. As a result, the battery function can be stopped before the thermoplastic resin in the sealing region of the jacket is melted, leading to a further improvement in the safety. Further, the separator makes it possible to suppress the elevation of the impedance when the battery is used under an ordinary environment of high temperatures. It follows that excellent charge-discharge characteristics can be maintained under high temperatures.

In the secondary battery of the present invention, the separator is formed of a porous sheet made of at least one kind of material selected from the group consisting of polyolefin, cellulose and polyvinylidene fluoride (PVdF), has a thickness of 5 to 30 $\mu$m, and exhibits an air permeability not higher than 600 seconds/100 cm$^3$. Because of the particular construction, the pores of the separator are promptly closed when the temperature is rapidly elevated. As a result, the battery function can be stopped before the thermoplastic resin in the sealing region of the jacket is melted so as to further improve the safety. Also, the separator serves to suppress elevation of the internal impedance of the battery when the battery is used under an ordinary environment of high temperatures, with the result that excellent charge-discharge characteristics can be maintained under high temperatures.

In the secondary battery of the present invention, a porous sheet made of at least one kind of material selected from the group consisting of polyolefin, cellulose and polyvinylidene fluoride is used as a separator, and polyolefin is used as the thermoplastic resin layer. As a result, the pores of the porous separator can be closed promptly when the temperature is rapidly elevated. It follows that the battery function can be stopped before the thermoplastic resin forming the sealing region of the jacket is melted, leading to a further improved safety. Also, since the separator serves to suppress the elevation of the internal impedance of the battery when the battery is used under an ordinary atmosphere of high temperatures, excellent charge-discharge characteristics can be maintained under high temperatures. Further, since it is possible to prevent the thermoplastic resin forming the sealing region from being corroded by the nonaqueous electrolyte, the hermetic properties of the jacket can be further improved.

In the secondary battery of the present invention, a liquid nonaqueous electrolyte is used as the nonaqueous electrolyte, making it possible to diminish the impedance at the interface of the positive electrode and at the interface of the negative electrode, compared with a lithium ion secondary battery including a gel-like polymer electrolyte layer. In addition, the lithium ion conductivity can be increased, making it possible to improve the charge-discharge characteristics under a high rate.

The liquid nonaqueous electrolyte used in the secondary battery of the present invention is prepared by dissolving a lithium salt in a nonaqueous solvent. In addition, γ-butyrolactone is contained in an amount of 40% by volume to 95% by volume in the nonaqueous solvent. The particular construction makes it possible to allow the liquid nonaqueous electrolyte to permeate uniformly the separator. As a result, the mobility of the lithium ions within the separator can be improved so as to improve the large discharge characteristics of the secondary battery. It should also be noted that the nonaqueous electrolyte permits improving the thermal stability so as to suppress the abnormal heat generation of the battery, leading to a further improvement in safety. Further, γ-butyrolactone is excellent in its chemically stability. Therefore, by allowing the nonaqueous solvent to contain a predetermined amount of γ-butyrolactone, it is possible to prevent the reaction between the positive electrode active material and the nonaqueous electrolyte when the secondary battery is stored under conditions of a high temperature, with the result that the nonaqueous electrolyte is prevented from being oxidized and decomposed. Since the nonaqueous electrolyte is prevented from being oxidized, the amount of the gas generation can be suppressed so as to suppress the swelling of the jacket. It follows that it is possible to avoid inconveniences that the secondary battery fails to be housed in an electronic appliance and that electronic appliance is caused to perform malfunctions.

In applying the initial charging to the secondary battery, the charging temperature is set at 30 to 80° C., and the charging rate is controlled at 0.05 to 0.5 C so as to prevent the reaction between the negative electrode and γ-butyrolactone. Therefore, the nonaqueous electrolyte is prevented from being reduced and decomposed. It follows that it is possible to suppress the interfacial impedance of the negative electrode at a low level and to suppress precipitation of the metal lithium, thereby improving the large discharge characteristics and the charge-discharge cycle characteristics of the secondary battery.

In the secondary battery of the present invention, a gel nonaqueous electrolyte is used as the nonaqueous electrolyte, making it possible to suppress the heat generation of the secondary battery in the event of abnormalities such as the internal short-circuiting and an over-charging and when the secondary battery is left to stand under high temperatures not lower than 130° C., compared with the secondary battery using a gel-like polymer electrolyte. It follows that the safety of the secondary battery of the present invention can be further improved.

It should be noted that the jacket included in the secondary battery of the present invention tends to be deformed in accordance with the expansion and shrinkage of the electrode group accompanying the charge-discharge reaction and, thus, the jacket fails to hold strongly the electrode group. As a result, in accordance with progress in the charge-discharge cycles, the contact areas between the positive electrode and the separator and between the negative electrode and separator tend to be decreased. The decrease in the contact area brings about an increased internal resistance. In the present invention, however, the positive electrode and the separator are made integral by adhesive polymer dotted inside and at the boundary between the positive electrode and the separator. Likewise, the negative electrode and the separator are made integral by adhesive polymer dotted inside and at the boundary between the negative electrode and the separator. As a result, the internal impedance can be suppressed to a low level at the initial period of the charge-discharge cycles. Also, the low internal impedance can be maintained even if the charge-discharge cycles are increased, leading to a further improvement in the cycle life.

Further, as shown in FIG. 8, the nonaqueous electrolyte is held in fine cavities formed by the adhesive polymer. Therefore, the battery characteristics are not impaired even in the case of using a jacket made of a film. It follows that it is possible to provide a thin nonaqueous electrolyte secondary battery light in weight.

What should also be noted is that, in the secondary battery of the present invention, the positive electrode, the negative electrode and the separator are made integral by thermally curing the binder contained in the positive and negative electrodes, making it possible to suppress the internal impedance at the initial period of the charge-discharge cycles to a low level. In addition, the low internal impedance can be maintained in spite of the progress in the charge-discharge cycles, leading to a further improvement in the cycle life.

Preferred examples of the present invention will now be described.

In the first step, the pore-closing initiating temperature at which the pores of the porous separator begin to be closed will be described in respect of the separator included in the secondary battery of each of the Examples of the present invention and each of the Comparative Examples.

Specifically, a test cell obtained by allowing a porous separator to be sandwiched between two electrodes each consisting of a nickel plate was dipped in a nonaqueous solution of the composition equal to that of the nonaqueous electrolyte used in each of the Examples of the present invention and each of the Comparative Examples, followed by performing a vacuum impregnation for 10 minutes within a desiccator so as to prevent the nonaqueous solution from being evaporated. Incidentally, the electrode was sized at 10×15 mm, and the separator was sized at 20×25 mm. Then, the test cell was left to stand at 100° C. for 10 minutes, followed by elevating the temperature at a rate of 2° C./min so as to measure the cell temperature and the cell resistance at an AC frequency of 1 kHz. The temperature at which the cell resistance is abruptly increased was observed so as to determine the pore-closing initiating temperature of the porous separator.

EXAMPLE 1

<Preparation of Positive Electrode>

In the first step, a slurry was prepared by adding 91% by weight of lithium-containing cobalt oxide powder ($Li_xCoO_2$, where $0 \leq x \leq 1$), 2.5% by weight of acetylene black, 3% by weight of graphite, and 4% by weight of polyvinylidene fluoride (PVdF) to N-methyl pyrrolidone (NMP), followed by fully stirring the mixture. Then, both surfaces of a collector consisting of an aluminum foil having a thickness of 10 μm were coated with the slurry, followed by drying and pressing the collector so as to obtain a positive electrode in which a positive electrode layer having a thickness of 48 μm was supported on each surface of the collector. The electrode density of the resultant positive electrode was found to be 3.0 g/cm³, and the total thickness of the positive electrode layers was found to be 96 μm.

<Preparation of Negative Electrode>

In the first step, a slurry was prepared by adding 93% by weight of mesophase pitch based carbon fiber powder subjected to heat treatment at 3,000° C., said carbon fiber powder being used as a carbon material, and having a fiber diameter of 8 μm, an average fiber length of 20 μm, an average interplanar spacing $d_{002}$ of 0.3360 nm, and 7% by weight of polyvinylidene fluoride (PVdF) used as a binder to a N-methyl pyrrolidone (NMP) solution, followed by fully stirring the mixture. Then, both surfaces of a collector consisting of a copper foil having a thickness of 10 µm were coated with the slurry, followed by drying and pressing the collector so as to obtain a negative electrode in which a negative electrode layer having a thickness of 45 µm was supported on each surface of the collector. The electrode density of the resultant negative electrode was found to be 1.3 g/cm$^3$, and the total thickness of the negative electrode layers was found to be 90 µm.

<Separator>

Prepared was a separator consisting of a polyethylene porous film having a thickness of 20 µm, and a porosity of 40% as well as a pore-closing initiating temperature before the separator was incorporated into a electrode group as shown in Table 1.

<Preparation of Electrode Group>

An electrode group having a thickness of 2.5 mm, a width of 30 mm and a height of 50 mm was prepared by spirally winding a structure consisting of the positive electrode, the negative electrode and the separator interposed between the positive and negative electrodes, followed by flattening the spiral structure.

<Preparation of Nonaqueous Electrolyte>

A nonaqueous electrolyte was prepared by dissolving lithium borofluoride (LiBF$_4$) in a mixed solvent consisting of ethylene carbonate (EC) and γ-butyrolactone (BL) mixed at a volume ratio of 25:75 in an amount of 1.5 mol/L (liter).

On the other hand, prepared was a laminate film having a thickness of 100 µm and consisting of an aluminum foil used as a metal layer and a thermoplastic resin layer made of polypropylene having a melting point of 160° C. and covering each surface of the aluminum foil. A hot press was applied to the laminate film at 190° C. for heat sealing the mutually facing portions in the sealing region so as to form the laminate film into a bag. Then, the electrode group was housed in the bag and the both surfaces of the bag were held by a holder to allow the bag to have a thickness of 2.7 mm. Further, 0.3% by weight of an adhesive polymer of polyvinylidene fluoride (PVdF) was dissolved in an organic solvent of dimethyl formamide having a boiling point of 153° C. The resultant solution was poured into the electrode group housed in the bag in an amount of 0.6 mL per 100 mAh of battery capacity to permit the solution to permeate the inner region of the electrode group and, at the same time, to be attached to the entire surface of the electrode group.

In the next step, a vacuum drying was applied for 12 hours at 80° C. to the electrode group housed in the jacket so as to evaporate the organic solvent so as to permit the adhesive polymer to be retained within the cavities of the positive electrode, the negative electrode and the separator so as to form a porous bonding portion on the surface of the electrode group.

After the nonaqueous electrolyte was poured into the electrode group housed in the jacket, hot pressing under heat of 190° C. was applied to the open portion of the jacket, thereby to seal the open portion and, thus, to assemble a thin nonaqueous electrolyte secondary battery constructed as shown in FIGS. 3 to 8, said secondary battery having a thickness of 2.7 mm, a width of 32 mm and a height of 55 mm.

The following treatment was applied as the initial charging step to the resultant nonaqueous electrolyte secondary battery of Example 1. In the first step, the secondary battery was left to stand under a high temperature environment of 40° C. for 5 hours, followed by charging the secondary battery at a constant current and a constant voltage and under the charging rate of 0.2 C (120 mA) under the same environment for 10 hours, thereby the battery voltage was increased to 4.2V. Then, the secondary battery was discharged at a rate of 0.2 C under a temperature environment of 20° C. until the battery voltage was lowered to 2.7V. The discharge capacity in this discharge step was found to be 400 mAh. Further, a second charging was performed as in the first charging, except that the temperature was changed to 20° C.

EXAMPLES 2 TO 4

A thin nonaqueous electrolyte secondary battery was prepared as in Example 1, except that the pore-closing initiating temperature of the separator were changed as shown in Table 1.

EXAMPLE 5

A thin nonaqueous electrolyte secondary battery was prepared as in Example 1, except that the pore-closing initiating temperature of the separator and the melting point of polypropylene forming the jacket were changed as shown in Table 1.

EXAMPLE 6

A thin nonaqueous electrolyte secondary battery was prepared as in Example 1, except that the composition of the liquid nonaqueous electrolyte was changed as shown in Table 2.

EXAMPLES 7 AND 8

A thin nonaqueous electrolyte secondary battery was prepared-as in Example 1, except that the pore-closing initiating temperature of the separator were changed as shown in Table 1.

Comparative Example 1

A thin nonaqueous electrolyte secondary battery was prepared as in Example 1, except that the kind of the thermoplastic resin used in the jacket was changed as shown in Table 1.

Comparative Examples 2 and 3

A thin nonaqueous electrolyte secondary battery was prepared as in Example 1, except that the material and the pore-closing initiating temperature of the separator, and the melting point of polyethylene used as the jacket material were changed as shown in Table 1.

Comparative Example 4

A thin nonaqueous electrolyte secondary battery was prepared as in Example 6, except that the material and the pore-closing initiating temperature of the separator, and the melting point of polyethylene used as the jacket material were changed as shown in Table 1.

Comparative Example 5

A gel-like polymer electrolyte layer having a thickness of 80 µm was prepared by mixing a liquid nonaqueous electrolyte of the composition similar to that in Example 6 and polyvinylidene fluoride (PVdF), followed by gelling the mixture. Then, an electrode group was prepared by interposing the gel-like polymer electrolyte layer between the positive electrode and the negative electrode similar to those described previously in conjunction with Example 1.

Then, prepared was a laminate film similar to that described previously in conjunction with Example 1. A hot press was applied to the laminate film at 190° C. for heat sealing the mutually facing portions in the sealing region so as to form the laminate film into a bag. The electrode group was housed in the bag thus prepared and the open portion of the bag was heat sealed by hot pressing under a temperature of 190° C. so as to obtain a thin nonaqueous electrolyte secondary battery having a thickness of 2.7 mm, a width of 32 mm and a height of 55 mm.

In the next step, an initial charging was applied to the secondary battery as in Example 1 so as to manufacture a thin nonaqueous electrolyte secondary battery.

Large discharge characteristics (0.2 to 3 C) under the charged state of 4.2V were measured in respect of each of the thin nonaqueous electrolyte secondary batteries obtained in Examples 1 to 8 and Comparative Examples 1 to 5 so as to determine the discharge capacity under the discharge at 3 C when the discharge capacity under the discharge at 0.2 C was set at 100%, with the results as shown in Table 2.

Further, each of the thin nonaqueous electrolyte secondary batteries obtained in Examples 1 to 8 and Comparative Examples 1 to 5 was over-charged to 4.2V and was subjected to an oven test so as to measure the maximum temperature of the battery. Table 2 also shows the results.

Further, the secondary battery in each of Examples 1–8 and Comparative Examples 1 to 4 as decomposed after the initial charge-discharge treatment so as to take out the separator. The separator was dipped in a dimethyl formamide solution for removing the nonaqueous electrolyte and polyvinylidene fluoride attached to the separator, followed by drying the separator at 60° C. under a reduced pressure so as to prevent the separator from being thermally shrunk. Then, the pore-closing initiating temperature of the separator was measured, with the results as shown in Table 1. Incidentally, the separator may be dried under atmospheric pressure, though the drying was performed under a reduced pressure in this experiment. For shortening the drying time, it is desirable to employ drying under a reduced pressure.

TABLE 1

| | Material of separator | Pore-closing initiating temperature (° C.) | | Kind of thermoplastic resin | Melting point of thermoplastic resin (° C.) |
| --- | --- | --- | --- | --- | --- |
| | | Before incorporating | After dismantling | | |
| Example 1 | PE | 120 | 125 | PP | 160 |
| Example 2 | PE | 110 | 120 | PP | 160 |
| Example 3 | PE | 140 | 145 | PP | 160 |
| Example 4 | PE | 105 | 110 | PP | 160 |
| Example 5 | PE | 100 | 110 | PP | 145 |
| Example 6 | PE | 120 | 130 | PP | 160 |
| Example 7 | PE | 130 | 135 | PP | 160 |
| Example 8 | PE | 135 | 140 | PP | 160 |
| Comparative Example 1 | PE | 120 | 125 | PE | 110 |
| Comparative Example 2 | PP | 150 | 155 | PE | 110 |
| Comparative Example 3 | PP | 180 | 185 | PE | 140 |
| Comparative Example 4 | PP | 150 | 155 | PE | 110 |
| Comparative Example 5 | Polymer electrolyte | — | — | PP | 160 |

TABLE 2

| | Electrolyte composition | | Form of nonaqueous electrolyte | 3C discharge retention rate (%) | Maximum temperature during oven test (° C.) |
| --- | --- | --- | --- | --- | --- |
| | Solute | Nonaqueous solvent | | | |
| Example 1 | 1.5 MLiBF4 | EC/BL(1:3) | Liquid | 93 | 140 |
| Example 2 | 1.5 MLiBF$_4$ | EC/BL(1:3) | Liquid | 88 | 140 |
| Example 3 | 1.5 MLiBF$_4$ | EC/BL(1:3) | Liquid | 90 | 150 |
| Example 4 | 1.5 MLiBF$_4$ | EC/BL(1:3) | Liquid | 85 | 140 |
| Example 5 | 1.5 MLiBF$_4$ | EC/BL(1:3) | Liquid | 85 | 140 |
| Example 6 | 1 MLiPF$_6$ | EC/MEC(1:2) | Liquid | 95 | 155 |
| Example 7 | 1.5 MLiBF$_4$ | EC/BL(1:3) | Liquid | 92 | 145 |
| Example 8 | 1.5 MLiBF$_4$ | EC/BL(1:3) | Liquid | 94 | 148 |
| Comparative Example 1 | 1.5 MLiBF4 | EC/BL(1:3) | Liquid | 93 | 165 (Liquid leakage) |
| Comparative Example 2 | 1.5 MLiBF4 | EC/BL(1:3) | Liquid | 80 | 200 (Liquid leakage) |
| Comparative Example 3 | 1.5 MLiBF4 | EC/BL(1:3) | Liquid | 70 | 180 (Liquid leakage) |

TABLE 2-continued

|  | Electrolyte composition | | Form of nonaqueous electrolyte | 3C discharge retention rate (%) | Maximum temperature during oven test (° C.) |
| --- | --- | --- | --- | --- | --- |
|  | Solute | Nonaqueous solvent | | | |
| Comparative Example 4 | 1 M1iPF6 | EC/MEC(1:2) | Liquid | 80 | 250 (Gas generation) |
| Comparative Example 5 | 1 M1iPF6 | EC/MEC(1:2) | Gel | 40 | 300 (Gas generation) |

As apparent from Tables 1 and 2, the secondary battery in each of Examples 1 to 8 was low in the battery maximum temperature when the battery was stored under a high temperature atmosphere of 140° C., was free from the liquid leakage, and excellent in safety, compared the secondary battery obtained in each of Comparative Examples 1 to 5. Particularly, the secondary battery in each of Examples 1, 2, 4 and 5 exhibited a low pore-closing initiating temperature (after dismantling of the secondary battery). As a result, the heat generation did not take place under a high temperature atmosphere of 140° C., leading to a high safety. Also, the secondary battery in each of Examples 1 to 8 was found to permit suppressing the reduction in the battery capacity when the battery was discharged at a high rate, compared with the secondary battery comprising a gel-like polymer electrolyte, which was prepared in Comparative Example 5.

EXAMPLE 9

<Separator>

Prepared was a separator consisting of a polyethylene porous film having a thickness of 20 μm, and a porosity of 40% as well as an air permeability and a pore-closing initiating temperature before the separator was incorporated into a electrode group as shown in Table 3.

<Preparation of Electrode Group>

An electrode group having a thickness of 2.5 mm, a width of 30 mm, and a height of 50 mm was prepared by spirally winding a structure consisting of the positive electrode similar to that used in Example 1, the negative electrode similar to that used in Example 1 and the separator interposed between the positive and negative electrodes, followed by flattening the spiral structure.

On the other hand, prepared was a laminate film having a thickness of 100 μm and consisting of an aluminum foil used as a metal layer and a thermoplastic resin layer made of polypropylene having a melting point of 160° C. and covering each surface of the aluminum foil. The laminate film was shaped into a bag by hot pressing under heat of 190° C. Then, the electrode group was housed in the bag and the both surfaces of the bag were held by a holder to allow the bag to have a thickness of 2.7 mm. Further, 0.3% by weight of an adhesive polymer of polyvinylidene fluoride (PvdF) was dissolved in an organic solvent of dimethyl formamide having a boiling point of 153° C. The resultant solution was poured into the electrode group housed in the bag in an amount of 0.6 mL per 100 mAh of battery capacity to permit the solution to permeate the inner region of the electrode group and, at the same time, to be attached to the entire surface of the electrode group.

In the next step, a vacuum drying was applied for 12 hours at 80° C. to the electrode group housed in the jacket so as to evaporate the organic solvent so as to permit the adhesive polymer to be retained within the cavities of the positive electrode, the negative electrode and the separator so as to form a porous bonding portion on the surface of the electrode group.

After the nonaqueous electrolyte similar to that used in Example 1 was poured into the electrode group housed in the jacket, hot pressing under a temperature of 190° C. was applied to the open portion of the jacket, thereby to seal the open portion and, thus, to assemble a thin nonaqueous electrolyte secondary battery constructed as shown in FIGS. 3 to 8, said secondary battery having a thickness of 2.7 mm, a width of 32 mm and a height of 55 mm.

In the next step, an initial charging was applied to the secondary battery as in Example 1 so as to manufacture a thin nonaqueous electrolyte secondary battery.

EXAMPLES 10 TO 12

A thin nonaqueous electrolyte secondary battery was prepared as in Example 9, except that the pore-closing initiating temperature and the air permeability of the separator were changed as shown in Table 3.

EXAMPLE 13

A thin nonaqueous electrolyte secondary battery was prepared as in Example 9, except that the pore-closing initiating temperature, and the air permeability of the separator, and the melting point of polypropylene forming the jacket were changed as shown in Table 3.

EXAMPLE 14

A thin nonaqueous electrolyte secondary battery was prepared as in Example 9, except that the composition of the liquid nonaqueous electrolyte was changed as shown in Table 4.

EXAMPLE 15

A thin nonaqueous electrolyte secondary battery was prepared as in Example 9, except that the material, the pore-closing initiating temperature and the air permeability of the separator were changed as shown in Table 3.

EXAMPLE 16

A thin nonaqueous electrolyte secondary battery was prepared as in Example 1, except that the material, the pore-closing initiating temperature, and the air permeability of the separator, and the kind of the thermoplastic resin used in the jacket were changed as shown in Table 3.

EXAMPLE 17

A thin nonaqueous electrolyte secondary battery was prepared as in Example 9, except that the pore-closing initiating temperature and the air permeability of the separator, and the kind of the thermoplastic resin were changed as shown in Table 3.

EXAMPLE 18

A thin nonaqueous electrolyte secondary battery was prepared as in Example 9, except that the composition of the nonaqueous electrolyte was changed as shown in Table 4.

EXAMPLE 19

A gel-like nonaqueous electrolyte was prepared by mixing 88% by mole of a liquid nonaqueous electrolyte of the composition similar to that used in Example 18 and 12% by mole of polyacrylonitrile under a temperature of 120° C.

After the gel-like electrolyte was impregnated in a separator similar to that explained in Example 9, an electrode group was prepared by interposing the separator between the positive electrode and the negative electrode similar to those explained in Example 1.

Then, prepared was a laminate film similar to that described previously in conjunction with Example 1. A hot press was applied to the laminate film at 190° C. for heat sealing the mutually facing portions in the sealing region so as to form the laminate film into a bag. The electrode group was housed in the bag, and the open portion of the bag was heat sealed by hot pressing under a temperature of 190° C. to the open portion of the bag so as to obtain a thin nonaqueous electrolyte secondary battery.

In the next step, an initial charging was applied to the secondary battery as in Example 1 so as to manufacture a thin nonaqueous electrolyte secondary battery.

EXAMPLES 20 AND 21

A thin nonaqueous electrolyte secondary battery was prepared as in Example 19, except that the air permeability of the separator was changed as shown in Table 3.

Comparative Example 6

A thin nonaqueous electrolyte secondary battery was prepared as in Example 9, except that the kind of the thermoplastic resin used in the jacket was changed as shown in Table 3.

Comparative Examples 7 and 8

A thin nonaqueous electrolyte secondary battery was prepared as in Example 9, except that the material, the pore-closing initiating temperature, and the air permeability of the separator, and the melting point of polyethylene used as the jacket material were changed as shown in Table 3.

Comparative Example 9

A thin nonaqueous electrolyte secondary battery was prepared as in Example 14, except that the material, the pore-closing initiating temperature, and the air permeability of the separator, and the melting point of polyethylene used as the jacket material were changed as shown in Table 3.

Comparative Example 10

A gel-like polymer electrolyte layer having a thickness of 80 μm was prepared by mixing a liquid nonaqueous electrolyte of the composition similar to that in Example 14 and polyvinylidene fluoride (PVdF), followed by gelling the mixture. Then, an electrode group was prepared by interposing the gel-like polymer electrolyte layer between the positive electrode and the negative electrode similar to those described previously in conjunction with Example 1.

Then, prepared was a laminate film similar to that described previously in conjunction with Example 1. A hot press was applied to the laminate film at 190° C. for heat sealing the mutually facing portions in the sealing region so as to form the laminate film into a bag. The electrode group was housed in the bag thus prepared and the open portion of the bag was heat sealed by hot pressing under a temperature of 190° C. so as to obtain a thin nonaqueous electrolyte secondary battery having a thickness of 2.7 mm, a width of 32 mm and a height of 55 mm.

In the next step, an initial charging was applied to the secondary battery as in Example 1 so as to manufacture a thin nonaqueous electrolyte secondary battery.

A capacity retention rate during discharge at 3 C and a maximum temperature in an oven test at 140° C. were measured as in Example 1 in respect of the secondary battery obtained in each of Examples 9 to 21 and Comparative Examples 6 to 10, with the results as shown in Table 4.

Further, the secondary battery in each of Examples 9–21 and Comparative Examples 6 to 9 was decomposed after the initial charge-discharge treatment so as to take out the separator. The separator was dipped in a dimethyl formamide solution for removing the nonaqueous electrolyte and polyvinylidene fluoride attached to the separator, followed by drying the separator at 60° C. under a reduced pressure so as to prevent the separator from being thermally shrunk. Then, the pore-closing initiating temperature of the separator was measured, with the results as shown in Table 3. Incidentally, the separator may be dried under atmospheric pressure, though the drying was performed under a reduced pressure in this experiment. For shortening the drying time, it is desirable to employ drying under a reduced pressure.

TABLE 3

| | Material of separator | Pore-closing initiating temperature (° C.) | | Air permeability (second/cm$^3$) | Kind of thermoplastic resin | Melting point of thermoplastic resin (° C.) |
| --- | --- | --- | --- | --- | --- | --- |
| | | Before incorporating | After dismantling | | | |
| Example 9 | PE | 120 | 125 | 100 | PP | 160 |
| Example 10 | PE | 110 | 120 | 200 | PP | 160 |
| Example 11 | PE | 140 | 145 | 150 | PP | 160 |
| Example 12 | PE | 105 | 110 | 250 | PP | 160 |
| Example 13 | PE | 100 | 110 | 300 | PP | 145 |
| Example 14 | PE | 120 | 130 | 100 | PP | 160 |
| Example 15 | PP + PE | 145 | 148 | 150 | PP | 160 |
| Example 16 | PE + PVdF | 140 | 145 | 150 | PP + PE | 160 |
| Example 17 | PE | 100 | 110 | 300 | PE | 145 |
| Example 18 | PE | 120 | 125 | 100 | PP | 160 |
| Example 19 | PE | 120 | 125 | 100 | PP | 160 |
| Example 20 | PE | 120 | 125 | 80 | PP | 160 |

TABLE 3-continued

|  | Material of separator | Pore-closing initiating temperature (° C.) | | Air permeability (second/cm³) | Kind of thermoplastic resin | Melting point of thermoplastic resin (° C.) |
| --- | --- | --- | --- | --- | --- | --- |
|  |  | Before incor- porating | After dismantling |  |  |  |
| Example 21 | PE | 120 | 125 | 50 | PP | 160 |
| Comparative Example 6 | PE | 120 | 125 | 100 | PE | 110 |
| Comparative Example 7 | PP | 150 | 155 | 300 | PE | 110 |
| Comparative Example 8 | PP | 180 | 185 | 300 | PE | 140 |
| Comparative Example 9 | PP | 150 | 155 | 300 | PE | 110 |
| Comparative Example 10 | Polymer electrolyte | — | — | — | PP | 160 |

TABLE 4

|  | Electrolyte composition | | Form of nonaqueous electrolyte | 3C discharge retention rate (%) | Maximum temperature during oven test (° C.) |
| --- | --- | --- | --- | --- | --- |
|  | Solute | Nonaqueous solvent |  |  |  |
| Example 9 | 1.5 MLiBF$_4$ | EC/BL(1:3) | Liquid | 93 | 140 |
| Example 10 | 1.5 MLiBF$_4$ | EC/BL(1:3) | Liquid | 88 | 140 |
| Example 11 | 1.5 MLiBF$_4$ | EC/BL(1:3) | Liquid | 90 | 150 |
| Example 12 | 1.5 MLiBF$_4$ | EC/BL(1:3) | Liquid | 85 | 140 |
| Example 13 | 1.5 MLiBF$_4$ | EC/BL(1:3) | Liquid | 85 | 140 |
| Example 14 | 1 M1iPF$_6$ | EC/MEC(1:2) | Liquid | 95 | 155 |
| Example 15 | 1.5 MLiBF$_4$ | EC/BL(1:3) | Liquid | 90 | 150 |
| Example 16 | 1.5 MLiBF$_4$ | EC/BL(1:3) | Liquid | 90 | 150 |
| Example 17 | 1.5 MLiBF$_4$ | EC/BL(1:3) | Liquid | 85 | 140 |
| Example 18 | 1 M1iPF$_6$ | EC/PC(1:1) | Liquid | 70 | 155 |
| Example 19 | 1 M1iPF$_6$ | EC/PC(1:1) | Gel | 60 | 158 |
| Example 20 | 1 MLiPF$_6$ | EC/PC(1:1) | Gel | 65 | 160 |
| Example 21 | 1 MLiPF$_6$ | EC/PC(1:1) | Gel | 70 | 160 |
| Comparative Example 6 | 1.5 MLiBF$_4$ | EC/BL(1:3) | Liquid | 93 | 165 (Liquid leakage) |
| Comparative Example 7 | 1.5 MLiBF$_4$ | EC/BL(1:3) | Liquid | 80 | 200 (Liquid leakage) |
| Comparative Example 8 | 1.5 MLiBF$_4$ | EC/BL(1:3) | Liquid | 70 | 180 (Liquid leakage) |
| Comparative Example 9 | 1 M1iPF$_6$ | EC/MEC(1:2) | Liquid | 80 | 250 (Gas generation) |
| Comparative Example 10 | 1 M1iPF$_6$ | EC/MEC(1:2) | Gel | 40 | 300 (Gas generation) |

As, apparent from Tables 3 and 4, the secondary battery in each of Examples 9 to 21 was low in the battery maximum temperature when the battery was stored under a high temperature atmosphere of 140° C., was free from the liquid leakage, and excellent in safety, compared the secondary battery obtained in each of Comparative Examples 6 to 10. Particularly, the secondary battery in each of Examples 9, 10, 12, 13 and 17 exhibited a low pore-closing initiating temperature (after dismantling of the secondary battery began to be closed). As a result, the heat generation did not take place under a high temperature atmosphere of 140° C., leading to a high safety. Also, the secondary battery in each of Examples 9 to 21 was found to permit suppressing the reduction in the battery capacity when the battery was discharged at a high rate, compared with the secondary battery comprising a gel-like polymer electrolyte, which was prepared in Comparative Example 10.

EXAMPLE 22

A thin nonaqueous electrolyte secondary battery was prepared as in Example 9, except that a polyethylene porous film having a thickness of 10 µm, an air permeability of 90 sec/100 cm³, a porosity of 50%, and a pore-closing initiating temperature of 130° C. was used as the separator.

EXAMPLE 23

A thin nonaqueous electrolyte secondary battery was prepared as in Example 22, except that the porous film used as the separator exhibited an air permeability of 150 sec/100 cm³.

EXAMPLE 24

A thin nonaqueous electrolyte secondary battery was prepared as in Example 22, except that the porous film used as the separator exhibited an air permeability of 400 sec/100 cm³.

EXAMPLE 25

A thin nonaqueous electrolyte secondary battery was prepared as in Example 22, except that the porous film used as the separator exhibited an air permeability of 580 sec/100 cm³.

A capacity retention rate during the discharge at 3 C and a maximum temperature in an oven test at 140° C. were measured as in Example 1 in respect of the secondary battery prepared in each of Examples 22 to 25. Table 5 shows the results.

Further, the secondary battery in each of Examples 22–25 was decomposed after the initial charge-discharge treatment so as to take out the separator. The separator was dipped in a dimethyl formamide solution for removing the nonaqueous electrolyte and polyvinylidene fluoride attached to the separator, followed by drying the separator at 60° C. under a reduced pressure so as to prevent the separator from being thermally shrunk. Then, the pore-closing initiating temperature of the separator was measured, with the result that the pore-closing initiating temperature for each separator was 135° C. Incidentally, the separator may be dried under atmospheric pressure, though the drying was performed under a reduced pressure in this experiment. For shortening the drying time, it is desirable to employ drying under a reduced pressure.

TABLE 5

|  | Air permeability of separator (sec/100 cm$^3$) | 3C discharge retention rate (%) | Maximum temperature during oven test (° C.) |
|---|---|---|---|
| Example 22 | 90 | 95 | 150 |
| Example 23 | 150 | 90 | 150 |
| Example 24 | 400 | 85 | 145 |
| Example 25 | 580 | 80 | 140 |

EXAMPLES 26 AND 27

A thin nonaqueous electrolyte secondary battery was prepared as in Example 1, except that the thickness of the separator was changed as shown in Table 6.

A maximum temperature was measured in an oven test at 140° C. as in Example 1 in respect of the secondary battery obtained in each of Examples 26 and 27, with the results as shown in Table 6. Incidentally, the data for Example 1 are also shown in Table 6.

Also, the energy density per unit weight was measured for each of the secondary batteries prepared in Examples 1, 26 and 27. The results are also shown in Table 6.

TABLE 6

|  | Thickness of separator ($\mu$m) | Maximum temperature during oven test (° C.) | Energy density per unit weight (Wh/L) |
|---|---|---|---|
| Example 26 | 5 | 150 | 370 |
| Example 1 | 20 | 140 | 311 |
| Example 27 | 30 | 140 | 250 |

As apparent from Table 6, the heat generation under a high temperature environment of 140° C. can be suppressed if the thickness of the separator is increased. However, the energy density per unit weight is decreased with increase in the thickness of the separator.

The thickness of the separator was changed to 5 $\mu$m in the secondary battery for Example 19 comprising a separator impregnated with a gel nonaqueous electrolyte. The highest temperature during the oven test was found to be increased by 10° C. However, the energy density per unit weight was found to be increased by 12%. Further, when the thickness of the separator was changed to 30 $\mu$m, the energy density per unit weight was found to be lowered by 30%. However, the highest temperature during the oven test was left unchanged at 140° C.

EXAMPLE 28

An electrode group having a thickness of 2.5 mm, a width of 30 mm and a height of 50 mm was prepared by interposing a separator similar to that used in Example 9 between the positive electrode and the negative electrode similar to those used in Example 1, followed by spirally winding the resultant laminate structure and subsequently flattening the spiral structure.

On the other hand, prepared was a laminate film similar to that used in Example 1. A hot press was applied to the laminate film at 190° C. for heat sealing the mutually facing portions in the sealing region so as to form the laminate film into a bag, followed by housing the electrode group in the resultant bag forming a jacket. Then, the jacket was pressed under a pressure of 10 kg/cm$^2$ in the thickness direction of the electrode group under a high temperature vacuum atmosphere of 80° C. so as to thermally cure the binder contained in the positive and negative electrode, thereby making integral the positive electrode, the negative electrode and the separator.

Further, 2 g of a nonaqueous electrolyte of the composition similar to that of the nonaqueous electrolyte used in Example 1 was poured into the electrode group housed in the jacket. Then, the open portion of the jacket was hot pressed under a temperature of 190° C. so as to assemble a thin nonaqueous electrolyte secondary battery having a thickness of 2.7 mm, a width of 32 mm and a height of 55 mm.

In the next step, an initial charging was applied to the secondary battery as in Example 1 so as to manufacture a thin nonaqueous electrolyte secondary battery.

A capacity retention rate during discharge at 3 C and a maximum temperature in an oven test at 140° C. were measured as in Example 1 in respect of the secondary battery obtained in Example 28, with the results that the capacity retention rate during discharge at 3 C was found to be 95%, and the maximum temperature was found to be 140° C.

EXAMPLE 29

An electrode group having a thickness of 2.5 mm, a width of 30 mm and a height of 50 mm was prepared by interposing a separator similar to that used in Example 9 between the positive electrode and the negative electrode similar to those used in Example 1, followed by spirally winding the resultant laminate structure and subsequently flattening the spiral structure.

On the other hand, prepared was a laminate film similar to that used in Example 1. A hot press was applied to the laminate film at 190° C. for heat sealing the mutually facing portions in the sealing region so as to form the laminate film into a bag, followed by housing the electrode group in the resultant bag forming a jacket. Then, the jacket was pressed under a pressure of 10 kg/cm$^2$ in the thickness direction of the electrode group under a high temperature vacuum atmosphere of 80° C. so as to thermally cure the binder contained in the positive and negative electrode, thereby making integral the positive electrode, the negative electrode and the separator.

Further, a nonaqueous electrolyte was prepared by dissolving lithium borofluoride ($LiBF_4$) in a nonaqueous solvent consisting of 33% by volume of ethylene carbonate (EC), 66% by volume of γ-butyrolactone (BL) and 1% of vinylene carbonate in an amount of 1.5 mol/L. Then, 2 g of the nonaqueous electrolyte thus prepared was poured into the electrode group housed in the jacket. Then, the open portion of the jacket was hot pressed under a temperature of 190° C. so as to assemble a thin nonaqueous electrolyte secondary battery having a thickness of 2.7 mm, a width of 32 mm and a height of 55 mm.

In the next step, an initial charging was applied to the secondary battery as in Example 1 so as to manufacture a thin nonaqueous electrolyte secondary battery.

A capacity retention rate during discharge at 3 C and a maximum temperature in an oven test at 140° C. were measured as in Example 1 in respect of the secondary battery obtained in Example 29, with the results that the capacity retention rate during discharge at 3 C was found to be 93%, and the maximum temperature was found to be 140° C.

EXAMPLE 30

A gel nonaqueous electrolyte was prepared by mixing 38% by mole of polyethylene oxide (PEO), 5% by mole of lithium phosphorus hexafluoride (LiPF$_6$), 38% by mole of ethylene carbonate (EC), and 19% by mole of propylene carbonate under a temperature of 120° C.

The gel nonaqueous electrolyte thus prepared was impregnated in a separator similar to that used in Example 9, followed by interposing the separator between the positive electrode and the negative electrode similar to those in Example 1. Then, the resultant laminate structure was cooled so as to solidify the nonaqueous electrolyte, thereby obtaining an electrode group in which the solid nonaqueous electrolyte was inside the separator, and was interposed between the positive electrode and the separator and between the negative electrode and the separator.

On the other hand, prepared was a laminate film similar to that used in Example 1. A hot press was applied to the laminate film at 190° C. for heat sealing the mutually facing portions in the sealing region so as to form the laminate film into a bag, followed by housing the electrode group in the resultant bag forming a jacket. Then, the open portion of the jacket was hot pressed under a temperature of 190° C. so as to assemble a thin nonaqueous electrolyte secondary battery having a thickness of 2.5 mm, a width of 30 mm and a height of 50 mm.

A maximum temperature of the secondary battery obtained in Example 30 was measured in an oven test at 140° C. The maximum temperature was found to be 140° C. Also, any of liquid leakage and gas generation was not recognized. According to the present invention, it is possible to improve the safety of a large nonaqueous electrolyte secondary battery as used in electric motor car.

As described above in detail, the present invention provides a nonaqueous electrolyte secondary battery that permits improving the charge-discharge characteristics at a high rate and also permits improving the safety.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:

an electrode group comprising a positive electrode, a negative electrode, and a porous separator interposed between the positive electrode and the negative electrode, said porous separator comprising polyethylene;

a nonaqueous electrolyte held by the porous separator; and a jacket formed of a sheet comprising a thermoplastic resin layer forming at least a portion of the inner surface, having said electrode group housed therein, and having mutually facing regions of said thermoplastic resin layer heat-sealed to each other to seal said electrode group therein;

wherein said positive electrode, said negative electrode and said separator are made integral;

wherein said thermoplastic resin layer comprises polypropylene;

wherein a melting point of said thermoplastic resin layer is 150° C. or higher and is higher than a pore-closing initiating temperature of said porous separator at which the pores of the separator begin to be closed.

2. The secondary battery according to claim 1, wherein said pore-closing initiating temperature falls within a range of between 100° C. and 150° C.

3. The secondary battery according to claim 1, wherein the air permeability of said separator is not higher than 600 seconds/100 cm$^3$.

4. The secondary battery according to claim 1, wherein said thermoplastic resin layer has a melting point not lower than 120° C.

5. The secondary battery according to claim 1, wherein said nonaqueous electrolyte is at least one kind of electrolyte selected from the group consisting of a liquid nonaqueous electrolyte, a gel nonaqueous electrolyte and a solid nonaqueous electrolyte.

6. The secondary battery according to claim 1, wherein said nonaqueous electrolyte comprises a nonaqueous solvent and a lithium salt dissolved in said nonaqueous solvent, and the nonaqueous solvent contains γ-butyrolactone in an amount falling within a range of between 40% by volume and 95% by volume.

7. The secondary battery according to claim 1, wherein said positive electrode and said separator are made integral by adhesive polymer present in at least a portion of the boundary between the positive electrode and separator, and said negative electrode and said separator are made integral by adhesive polymer present in at least a portion of the boundary between the negative electrode and separator.

8. The secondary battery according to claim 1, wherein said positive electrode and said negative electrode contain a binder, and the positive and negative electrodes and the separator are made integral by thermally curing said binder.

9. The secondary battery according to claim 1, wherein said sheet comprises an inner protective layer, an outer protective layer and an aluminum-containing metal layer arranged between the inner protective layer and the outer protective layer; and said inner protective layer comprises said thermoplastic resin layer.

10. The secondary battery according to claim 1, wherein the difference between the pore-closing initiating temperature and the melting temperature of the thermoplastic resin layer is 5° C. or more.

11. The secondary battery according to claim 1, wherein the difference between the pore-closing initiating temperature and the melting temperature of the thermoplastic resin layer is 20° C. or more.

12. The nonaqueous electrolyte secondary battery according to claim 1, wherein each of said positive electrode and negative electrode and separator contains an adhesive polymer.

13. The secondary battery according to claim 12, wherein said adhesive polymer contains at least one polymer selected from the group consisting of polyacrylonitrile, polyacrylate, polyvinylidene fluoride, polyvinylchloride and polyethylene oxide.

14. The secondary battery according to claim 12, wherein a total amount of said adhesive polymer falls within the range of 0.1 to 6 mg per battery capacity of 100 mAh.

15. The nonaqueous electrolyte secondary battery according to claim 1, wherein the pore-closing initiating temperature of the porous separator falls within the range of 105 to 135° C.

16. The nonaqueous electrolyte secondary battery according to claim 1, wherein the porous separator further comprises at least one kind of material selected from the group consisting of polypropylene, cellulose and polyvinylidene fluoride.

* * * * *